(12) United States Patent
Carragher et al.

(10) Patent No.: US 7,983,986 B1
(45) Date of Patent: Jul. 19, 2011

(54) SYSTEM FOR CARD ACTIVITY-BASED MORTGAGE CREDITING

(76) Inventors: Philip Carragher, Glencoe, IL (US); Steven Earl Webster, Merritt Island, FL (US)

( * ) Notice: Subject to any disclaimer, the term of this patent is extended or adjusted under 35 U.S.C. 154(b) by 1350 days.

(21) Appl. No.: 09/604,696

(22) Filed: Jun. 26, 2000

(51) Int. Cl.
*G06Q 40/00* (2006.01)
(52) U.S. Cl. ............... 705/39; 705/38; 705/35
(58) Field of Classification Search ............ 705/14, 705/26, 28–42
See application file for complete search history.

(56) References Cited

U.S. PATENT DOCUMENTS

| | | | | |
|---|---|---|---|---|
| 4,722,554 A | * | 2/1988 | Pettit | 283/105 |
| 4,953,085 A | * | 8/1990 | Atkins | 705/36 R |
| 5,207,792 A | * | 5/1993 | Anderson | 273/256 |
| 5,466,919 A | * | 11/1995 | Hovakimian | 705/17 |
| 5,644,726 A | | 7/1997 | Oppenheimer | 395/238 |
| 5,644,727 A | * | 7/1997 | Atkins | 705/40 |
| 5,950,175 A | | 9/1999 | Austin | 705/35 |
| 5,983,206 A | * | 11/1999 | Oppenheimer | 705/38 |
| 6,070,153 A | * | 5/2000 | Simpson | 705/36 |
| 6,076,068 A | * | 6/2000 | DeLapa et al. | 705/14 |
| 6,088,682 A | * | 7/2000 | Burke | 705/17 |
| 6,222,914 B1 | * | 4/2001 | McMullin | 379/144.01 |
| 6,226,621 B1 | * | 5/2001 | Warsh | 705/14.36 |
| 6,386,444 B1 | * | 5/2002 | Sullivan | 235/379 |
| 6,408,284 B1 | * | 6/2002 | Hilt et al. | 705/40 |
| 6,422,462 B1 | | 7/2002 | Cohen | 235/381 |
| 6,578,011 B1 | * | 6/2003 | Forward | 705/14.39 |
| 6,615,187 B1 | * | 9/2003 | Ashenmil et al. | 705/36 R |
| 6,631,358 B1 | * | 10/2003 | Ogilvie | 705/39 |
| 6,751,596 B1 | * | 6/2004 | Hastings | 705/7.31 |
| 6,778,968 B1 | * | 8/2004 | Gulati | 705/36 R |
| 6,941,279 B1 | * | 9/2005 | Sullivan | 705/35 |
| 6,999,943 B1 | * | 2/2006 | Johnson et al. | 705/39 |
| 7,072,851 B1 | * | 7/2006 | Wilcox et al. | 705/14.34 |
| 7,219,071 B2 | * | 5/2007 | Gallagher | 705/14.14 |
| 7,315,841 B1 | * | 1/2008 | McDonald et al. | 705/38 |
| 2003/0093342 A1 | * | 5/2003 | Hillman et al. | 705/35 |

OTHER PUBLICATIONS

Anonymous, The Banks Fight Back by Co-Opting Cobranding, May 1, 1993, Credit Card News v5 n26 pp. 1-2.*
New B of A Card Offers Discounts on Bank Products; Kingson-Bloom, Jennifer; American Banker; Dec. 1, 1997; 2-pages.*
Your retail bank can offer the perks for a successful cobranding effort; Porges, K. Shelly; American Banker; Dec. 8, 1993; 3-pages.*
The banks fight back by co-opting cobranding; Anonymous; Credit Card News; May 1, 1993; 3-pages.*
"Stripped-Down or Jazzed Up". CardTrak Online, Jun. 1993.
PCT International Search Report for PCT/US00/35341, filed Dec. 22, 2000. pp. 1.
PCT Written Opinion of the International Searching Authority for PCT/US00/35341, filed Dec. 22, 2000. pp. 1-4.

(Continued)

*Primary Examiner* — Gregory Johnson
(74) *Attorney, Agent, or Firm* — Beem Patent Law Firm

(57) ABSTRACT

An electrical digital computer machine and a data processing system, methods of making and for using the machine, products produced thereby, as well as data structures and articles of manufacture pertaining thereto, and all necessary intermediates of that which is discussed herein, all in the field of computerized aspects of card crediting to mortgages and the like. More particularly, there is a method for card activity-based mortgage crediting, the method including the steps of: associating card activity with a mortgage of a cardholder; crediting an amount to the mortgage responsive to the card activity; and generating output including the charge card activity-based mortgage crediting; wherein at least some of the steps are carried out by a digital electrical computer.

58 Claims, 20 Drawing Sheets

OTHER PUBLICATIONS

"Office Action," U.S. Appl. No. 09/669,196 Mailed: Mar. 8, 2007.
"Office Action," U.S. Appl. No. 09/669,196 Mailed: Aug. 8, 2006.
"Office Action," U.S. Appl. No. 09/669,196 Mailed: Apr. 21, 2004.
"Principal Group Financial Information" Jul. 20, 2000, Beth Wright.

* cited by examiner

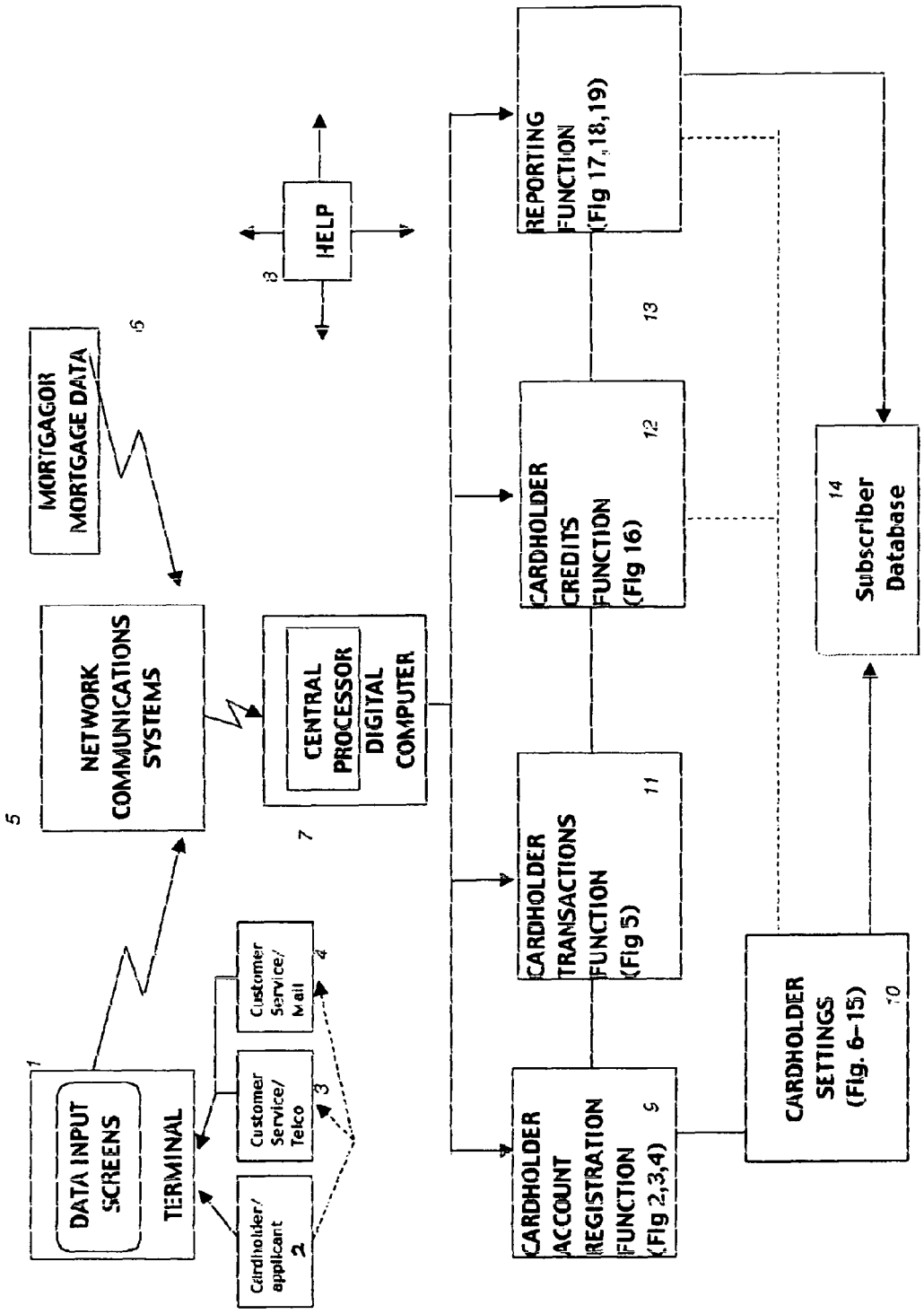

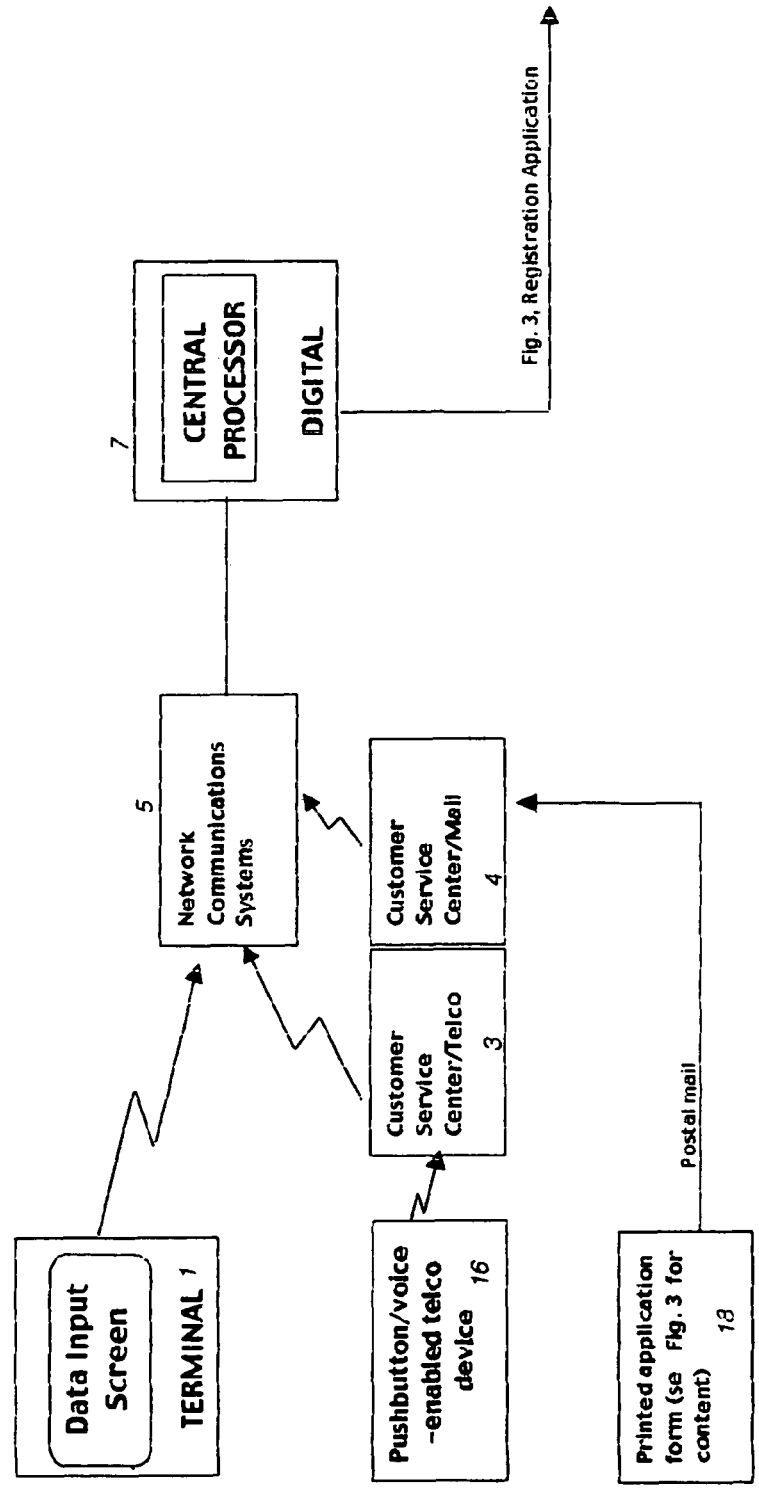

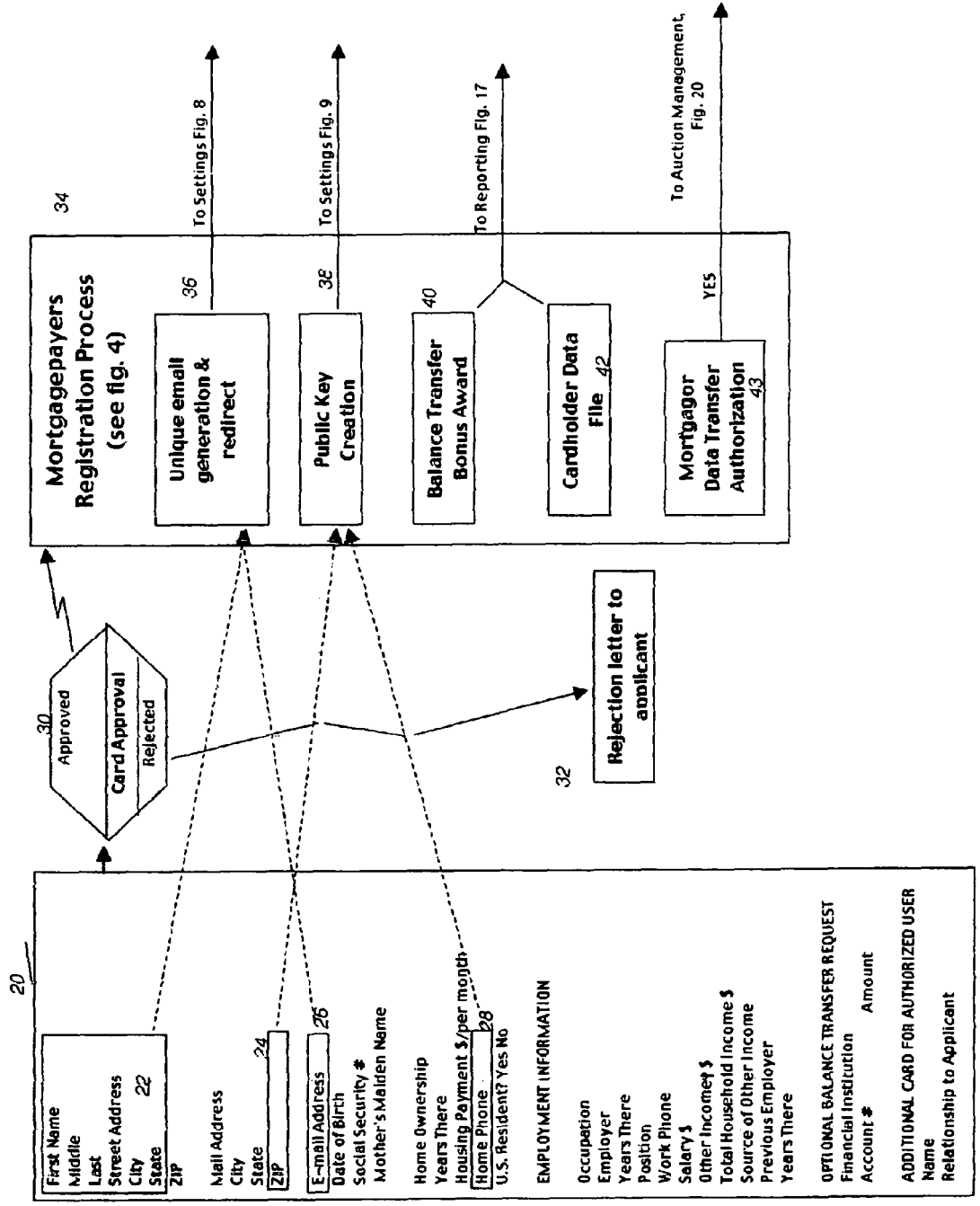

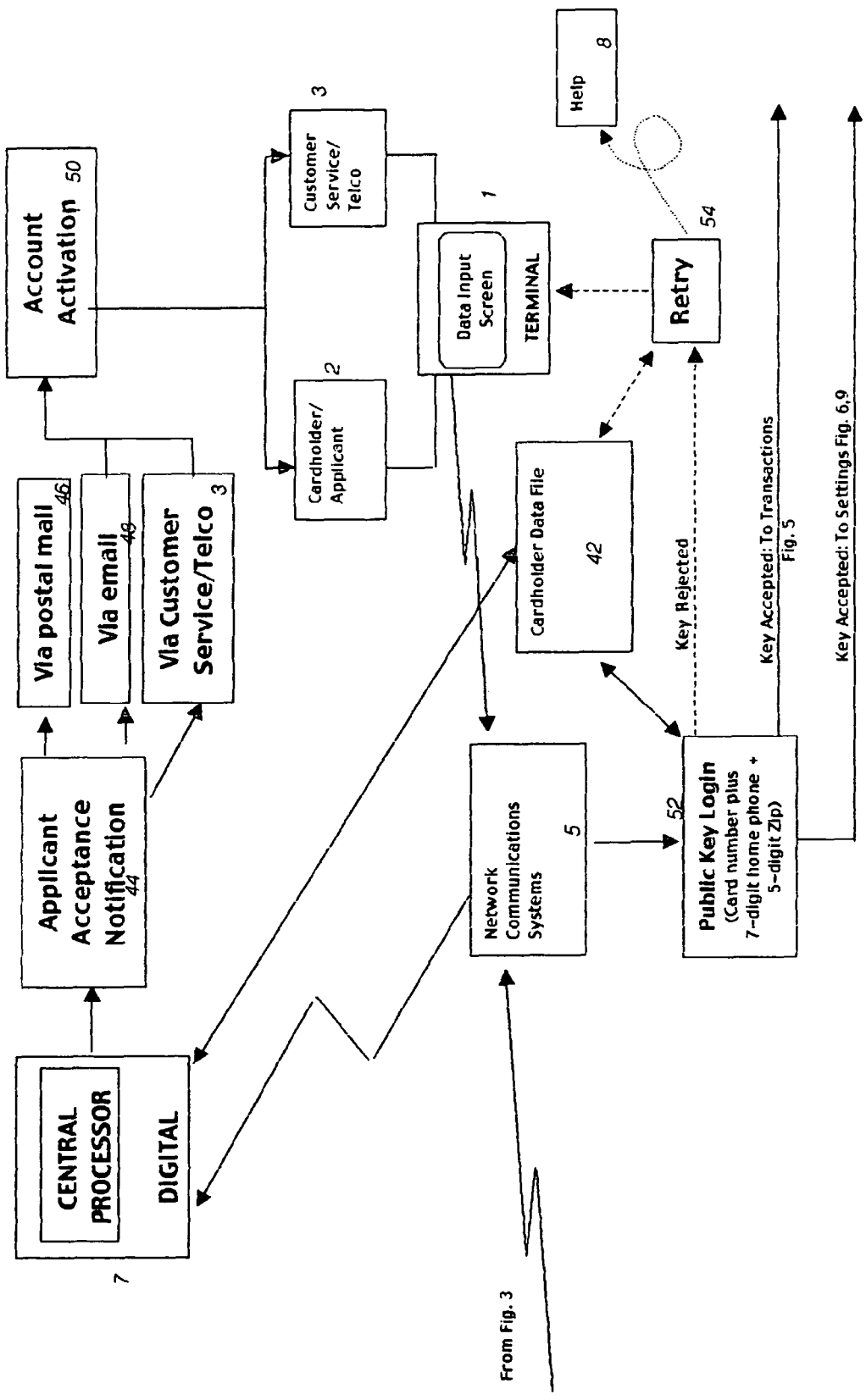

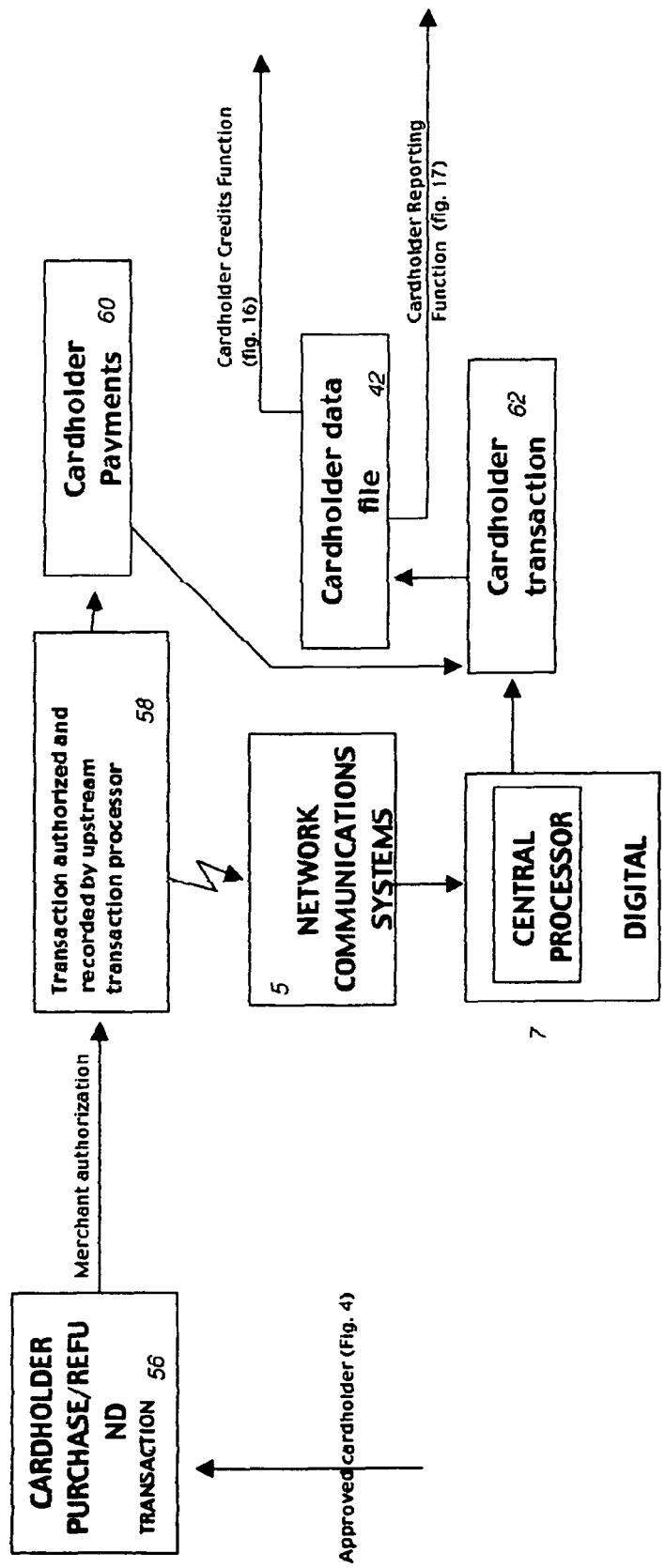

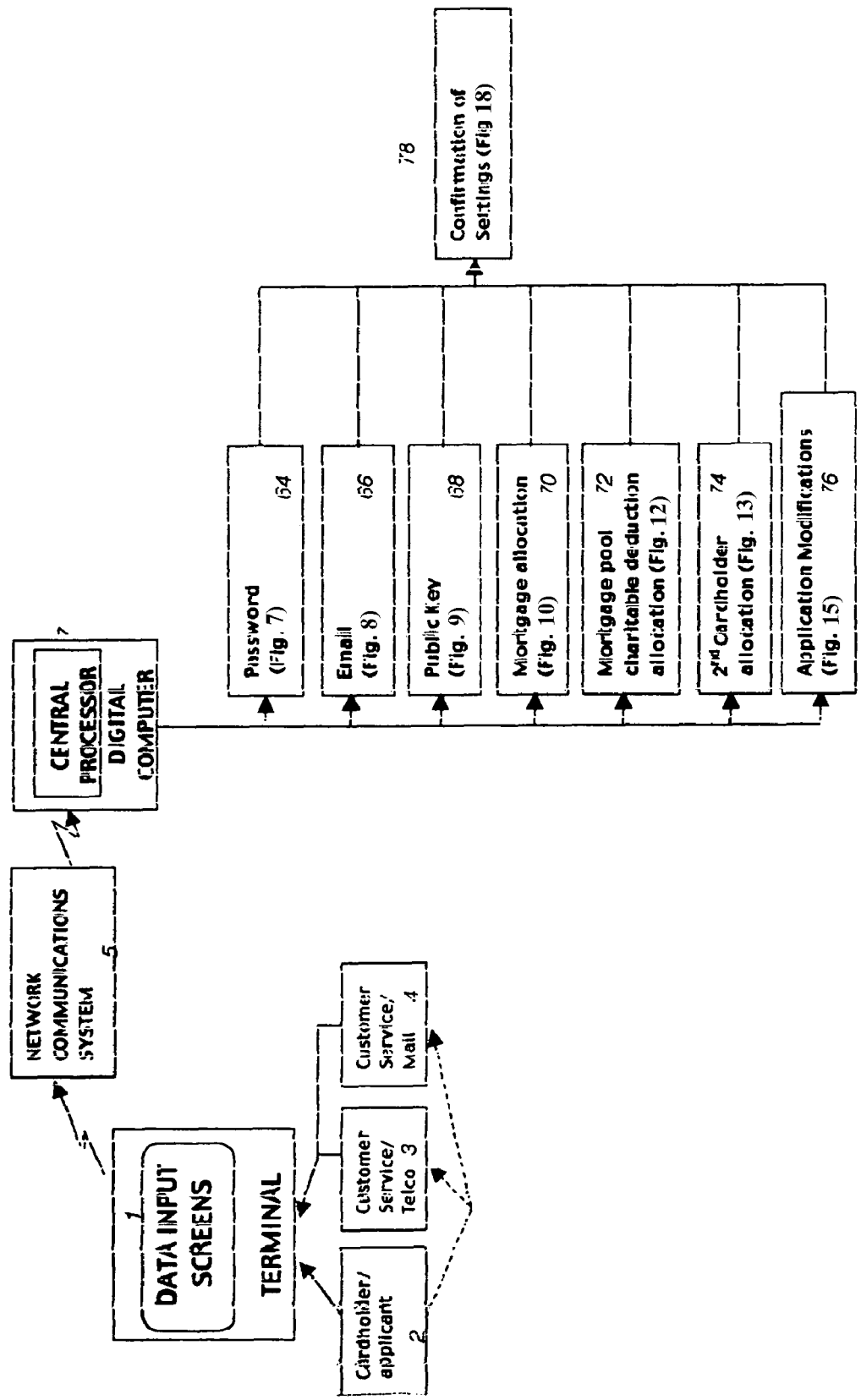

Settings Function: Password (Fig. 7)
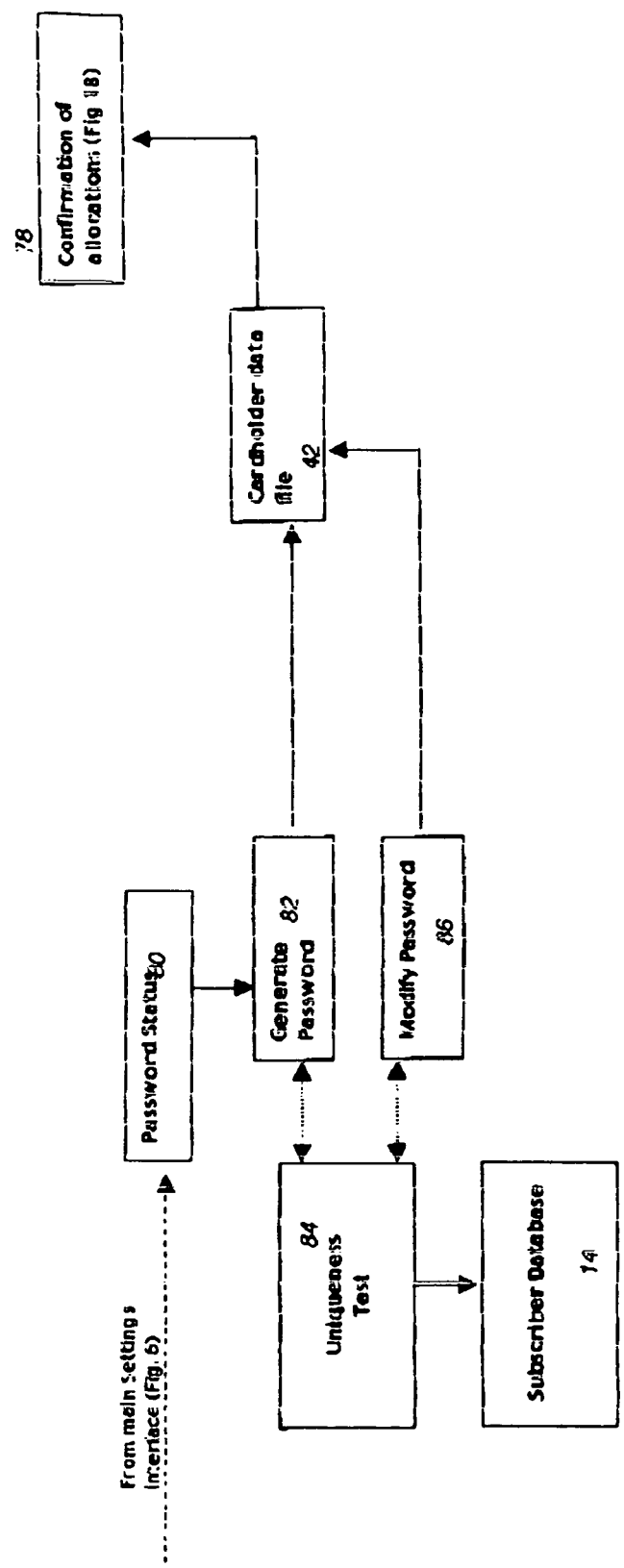

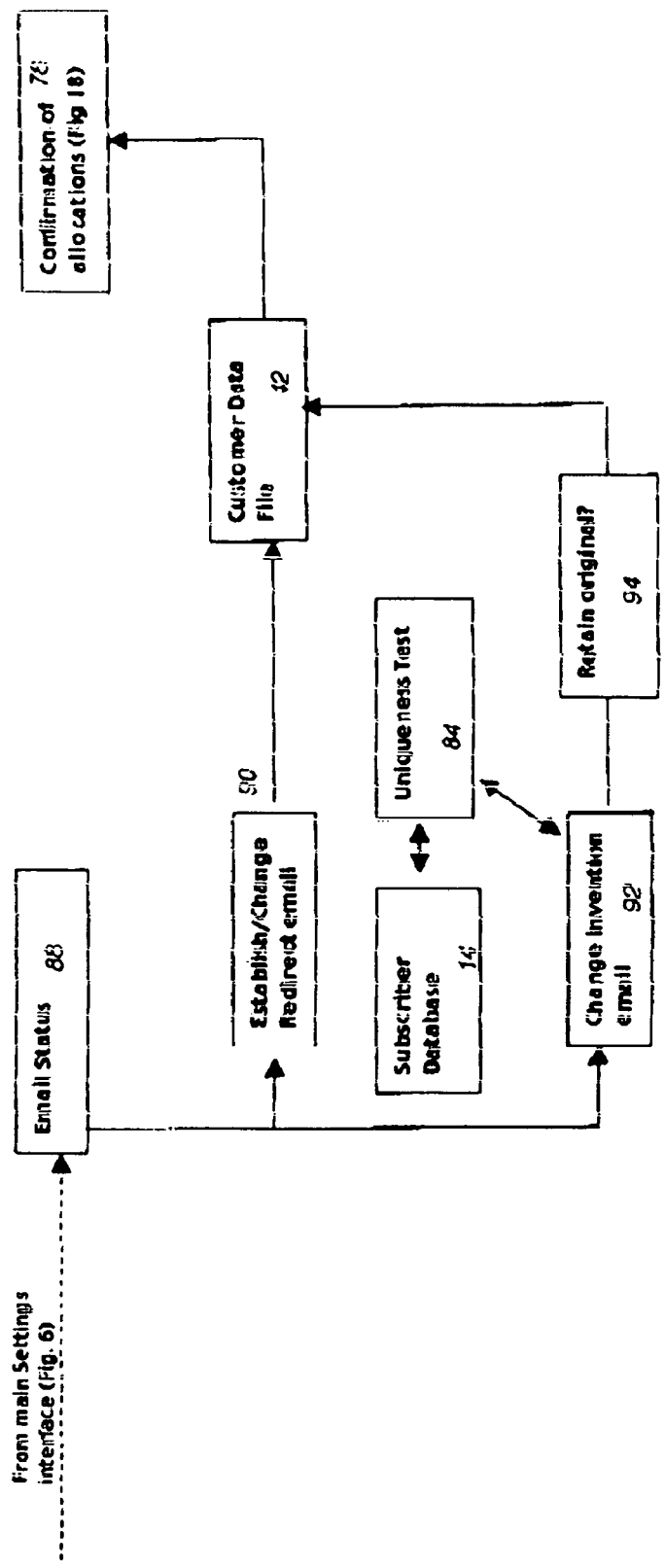

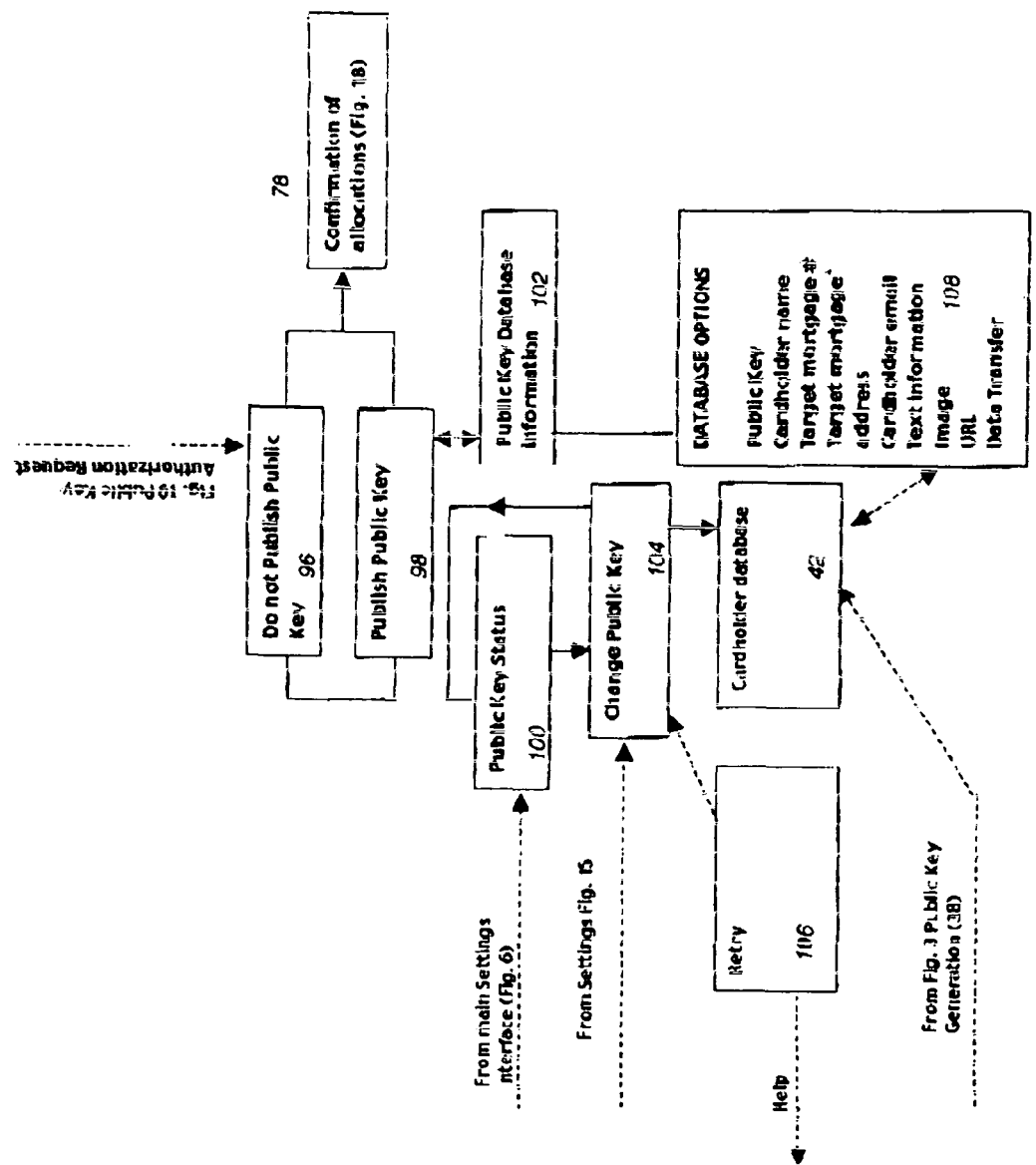

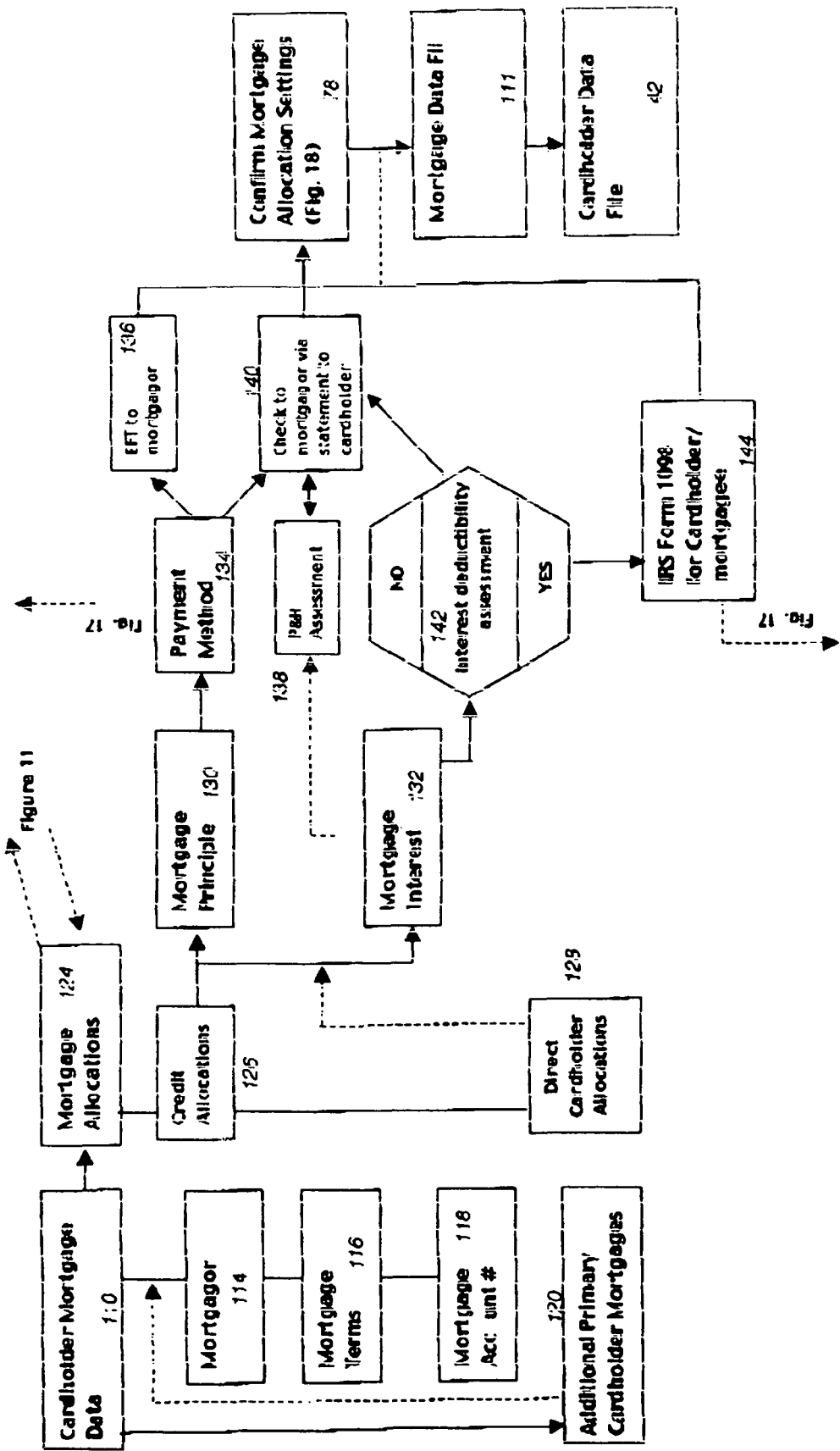

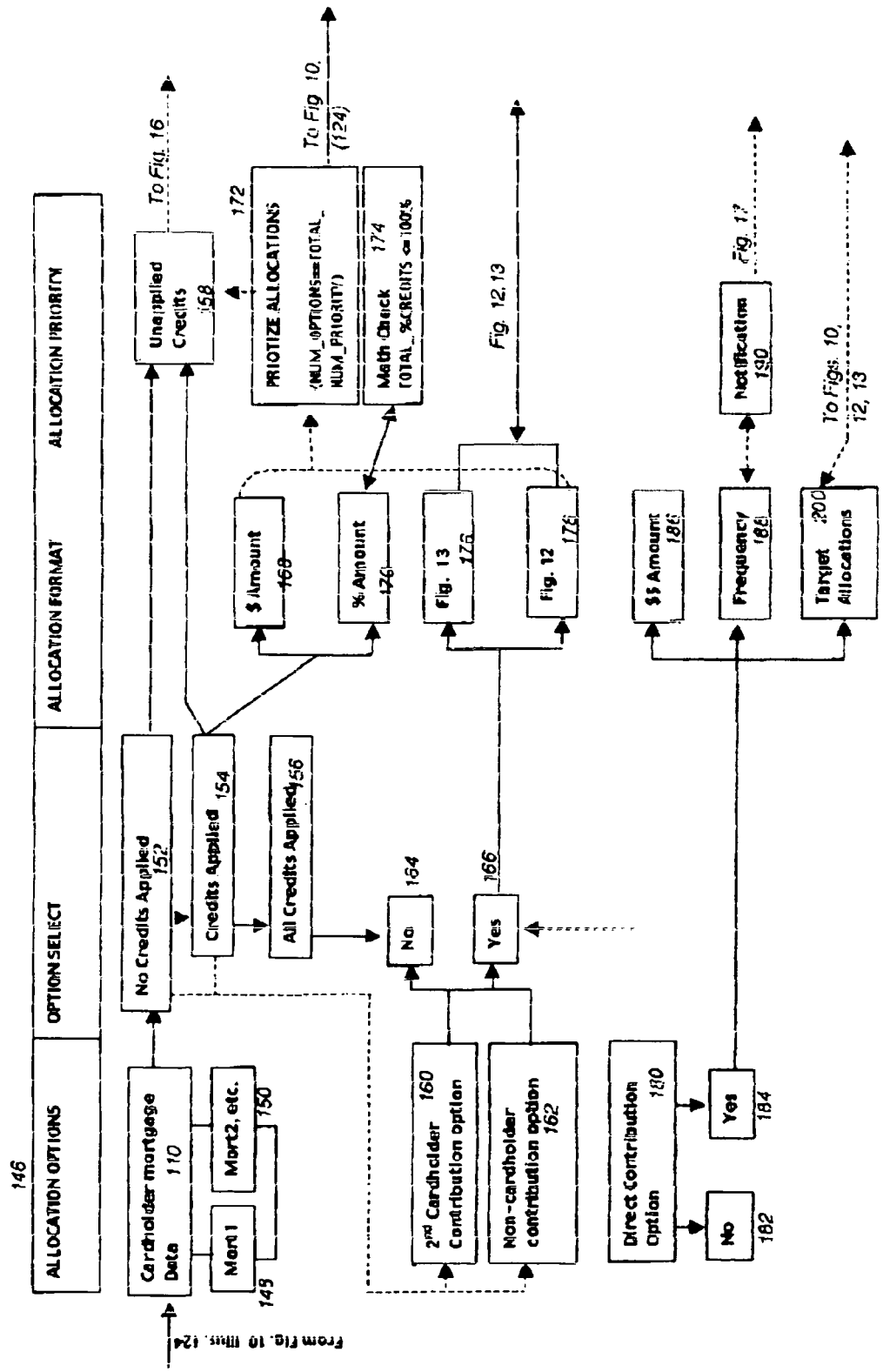

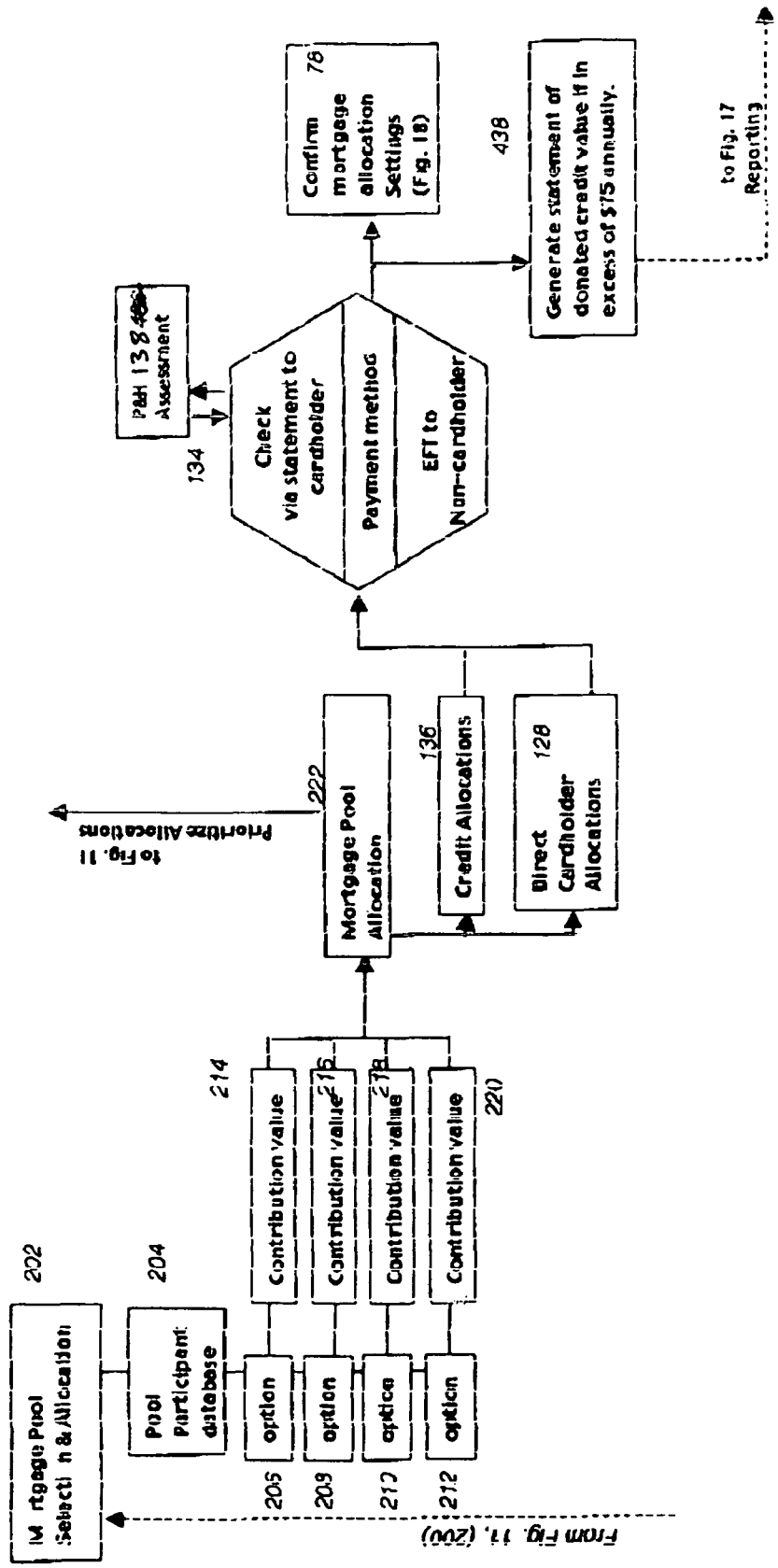

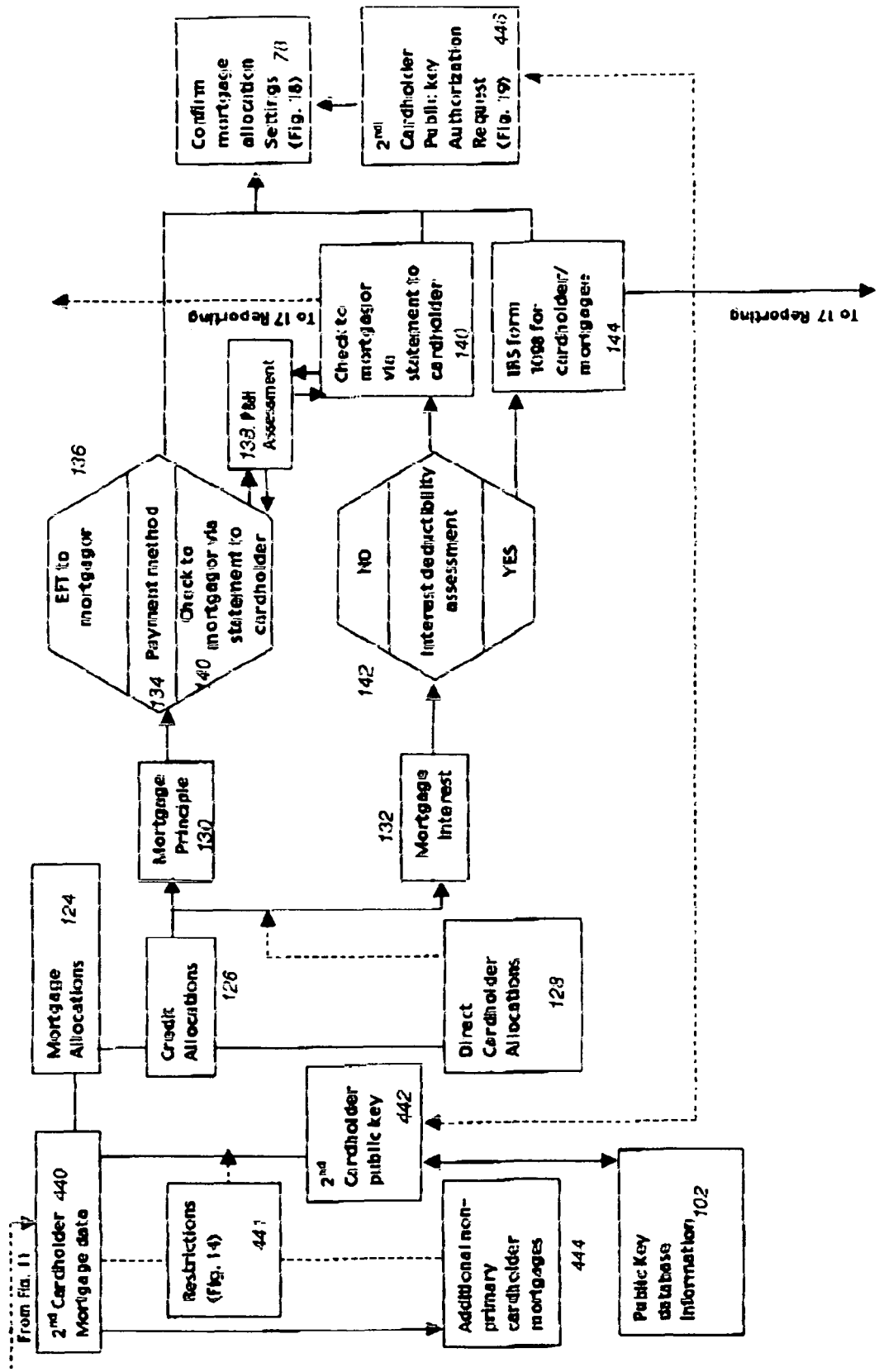

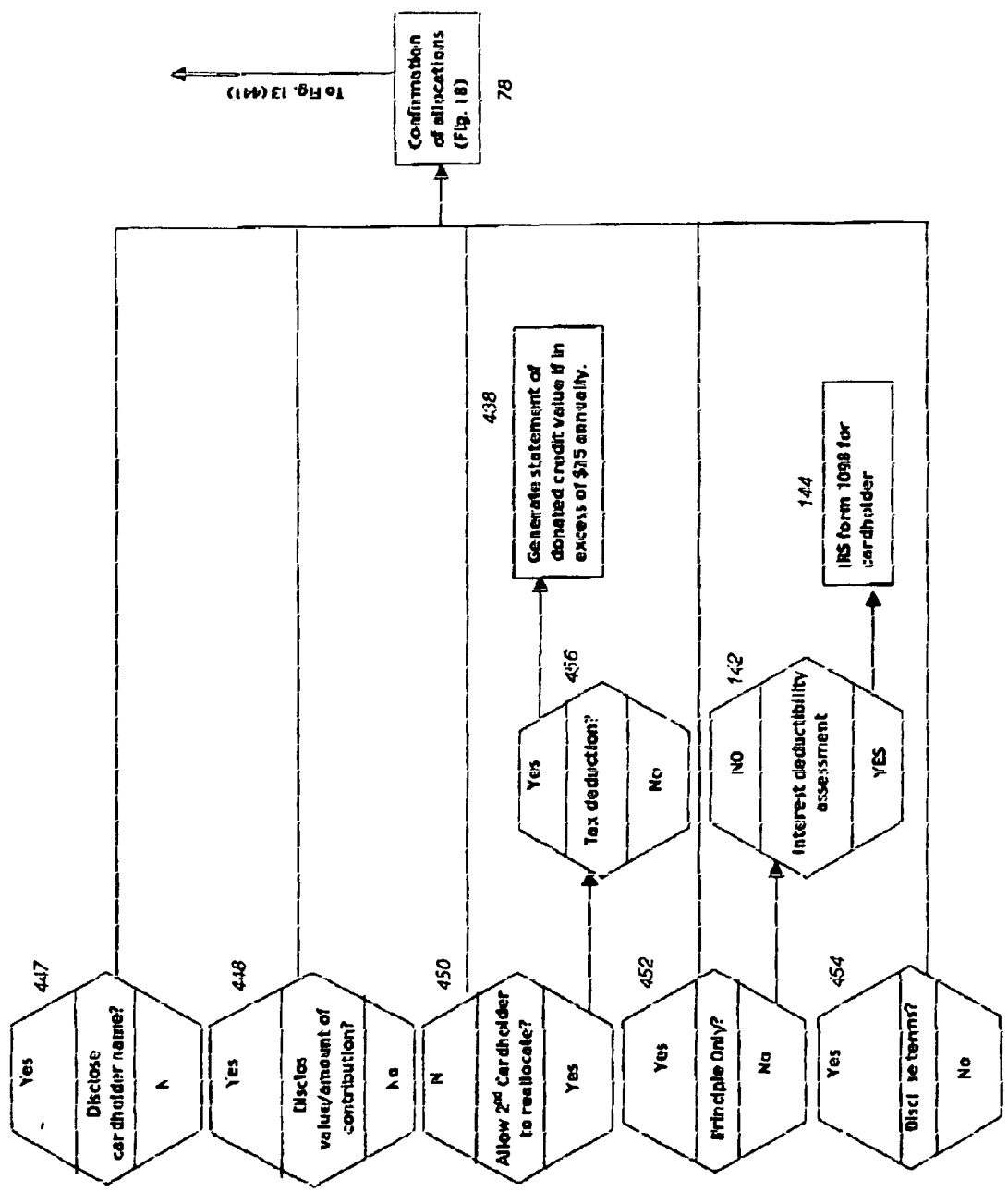

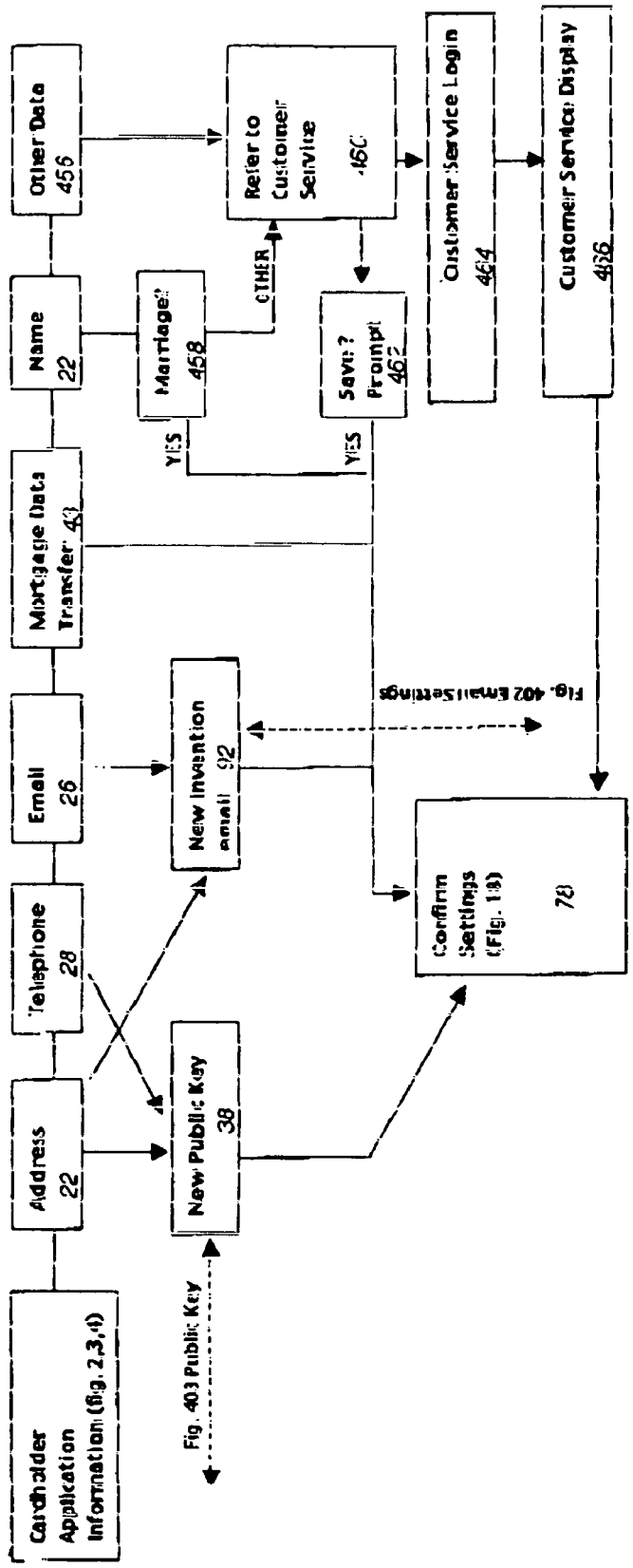

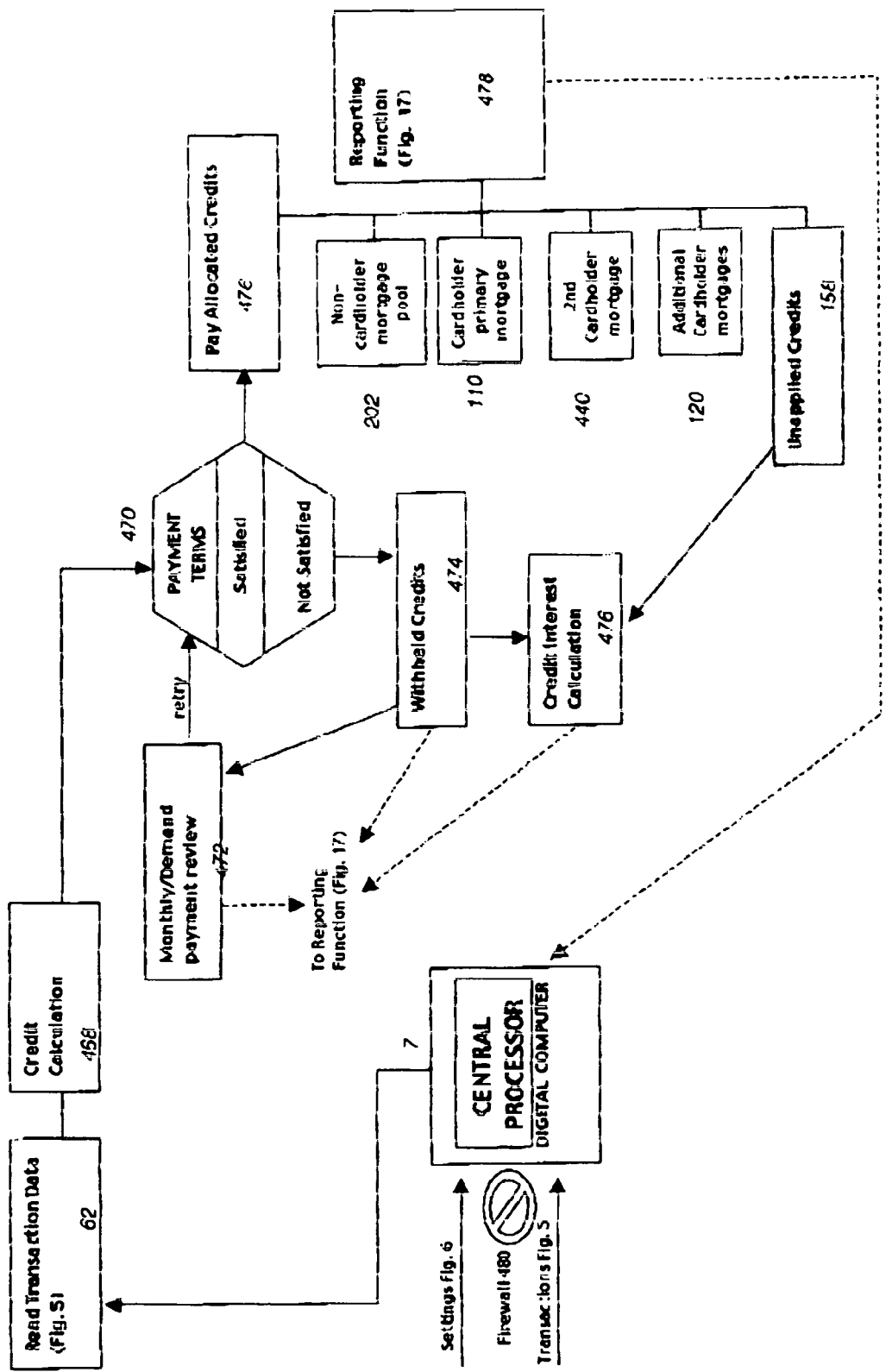

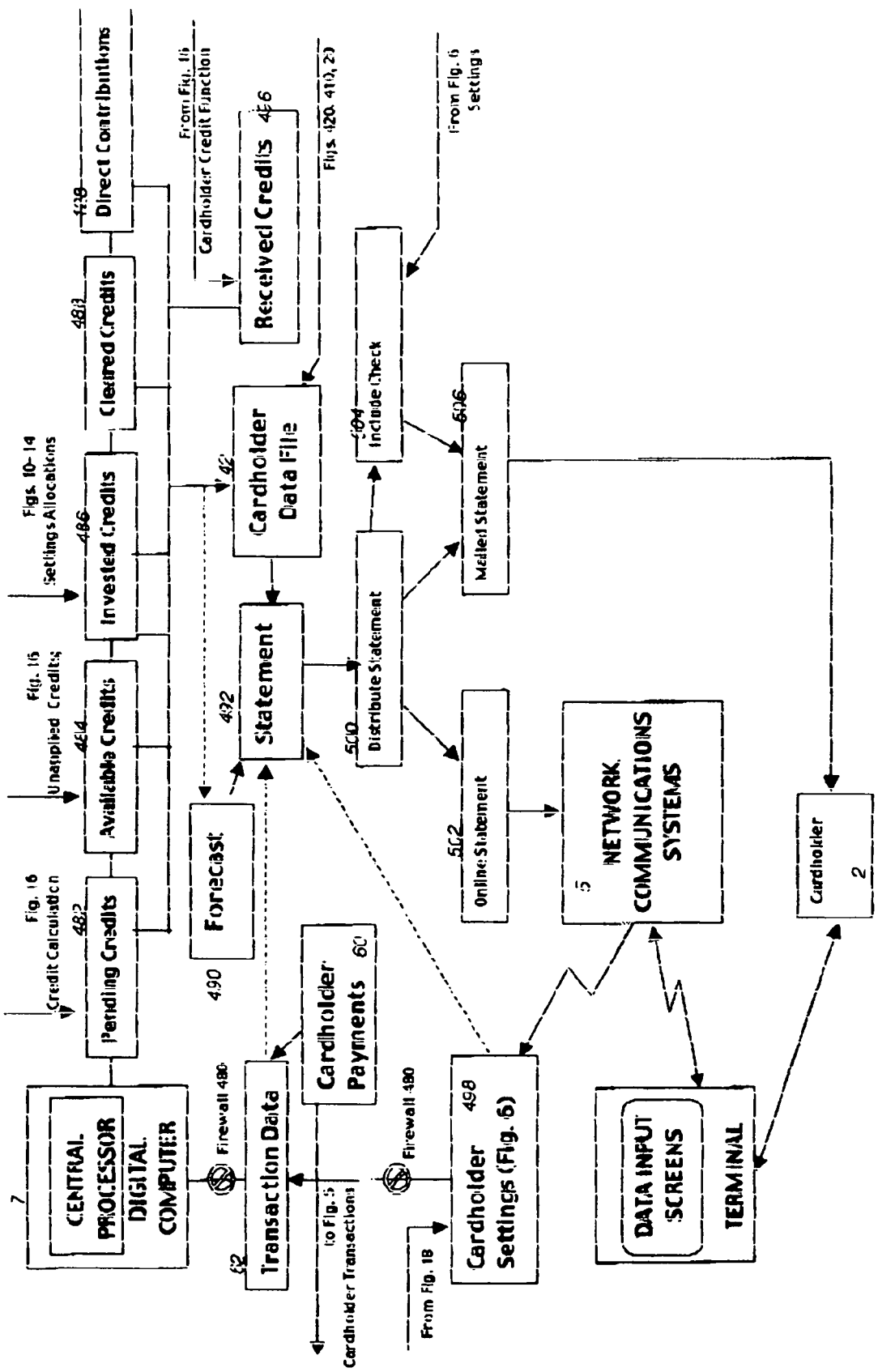

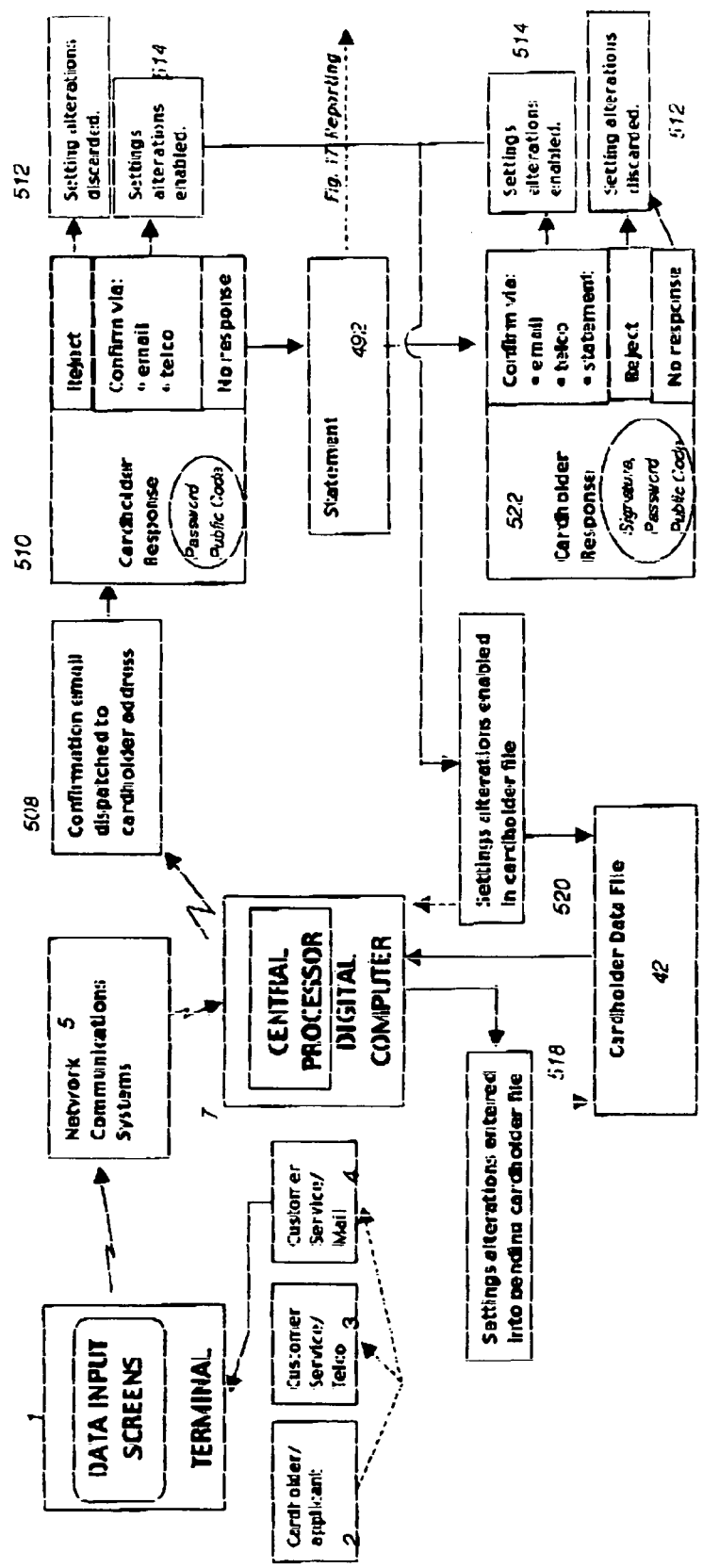

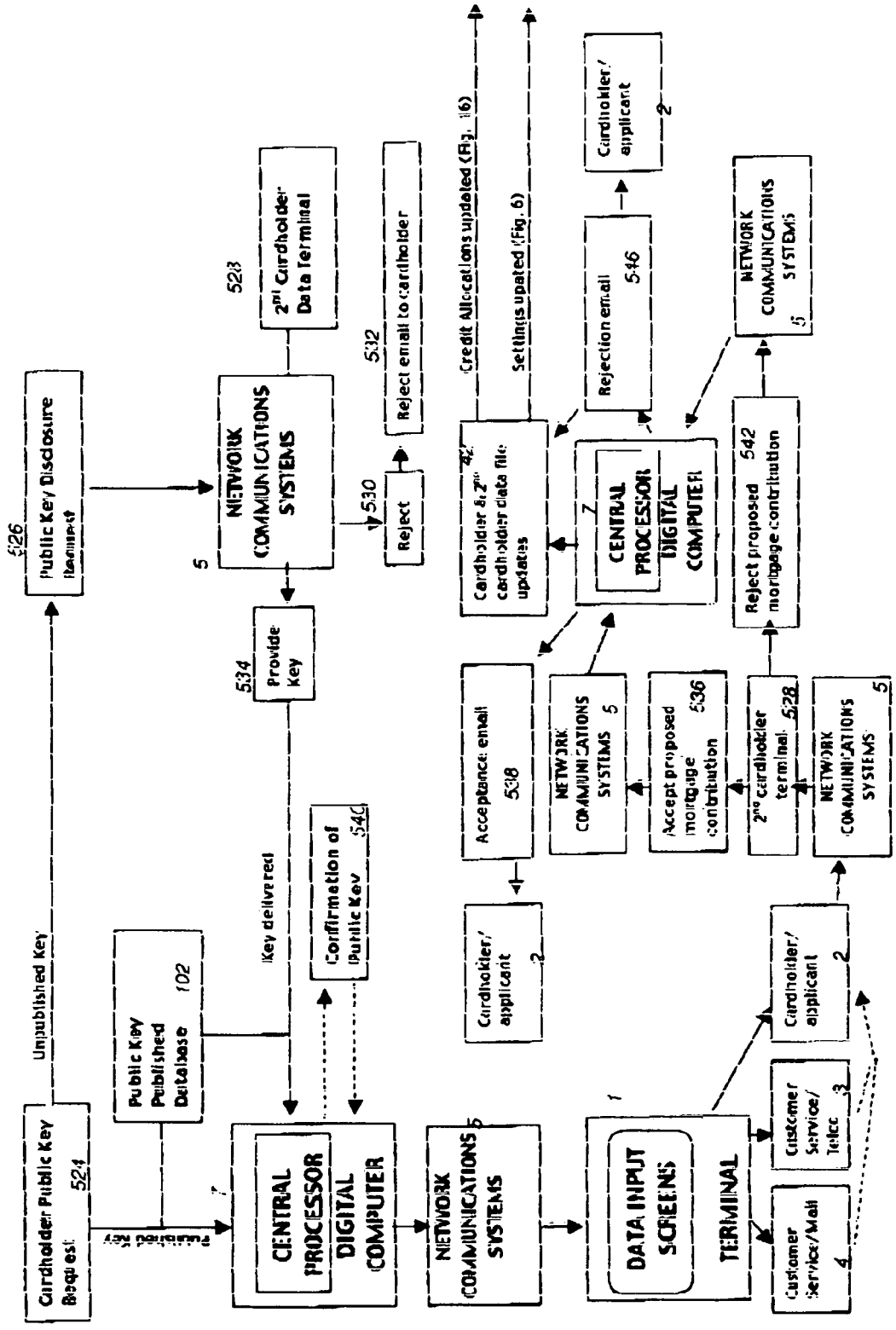

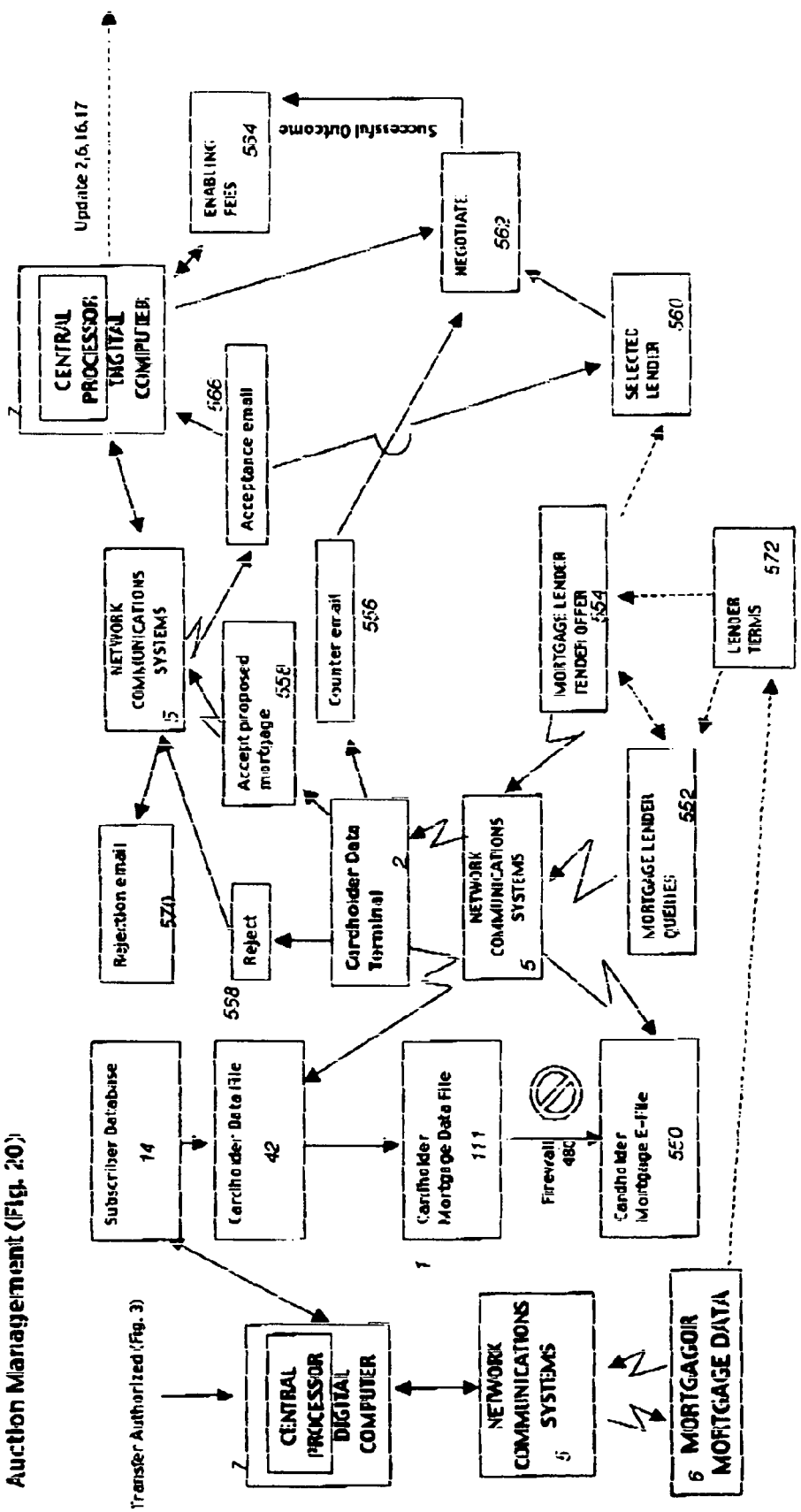

SYSTEM FOR CARD ACTIVITY-BASED MORTGAGE CREDITING

TECHNICAL FIELD OF THE INVENTION

The present invention pertains to an electrical digital computer machine and a data processing system, methods of making and for using the machine, products produced thereby, as well as data structures and articles of manufacture pertaining thereto, and all necessary intermediates of that which is discussed herein, all in the field of computerized aspects of card crediting to mortgages and the like. More particularly, this invention relates to a digital electrical data processing system having particular utility in financial fields related hereto. Still more particularly, the present invention pertains to card (e.g., charge card, bank card, etc.) activity-based mortgage crediting, along with automated generation of related documentation, inter-computer communications, and networking.

BACKGROUND OF THE INVENTION

Companies that issue credit cards and the like find themselves in an increasingly competitive environment. In order to compete more effectively, these companies look for an edge: they aggressively market their respective products and continue to look for innovative methods to attract and retain desirable consumers. Credit card solicitations find their way to consumers on an almost daily basis: through direct mail, telemarketing, and email. Nearly three billion credit card offers are mailed to Americans each year. This deluge of solicitations indicates the hunger these companies have for this business, and the marketers continue to search for unique ways to capture consumers, turning them into customers, and to capture as many highly desirable consumers as possible.

The value of a credit card program depends greatly on how many consumers use the card, the dollars transacted, what kind of balances they maintain and at what percentage rate, default rates, and the value of the data base of information generated by such a program. Therefore, the credit card companies look for well-heeled consumers that will use the card, maximize the dollars transacted, maintain balances at higher rates, and pay their bills in a timely manner.

In trying to attract and maintain desirable consumers in this highly competitive environment, these credit card issuers target specific populations that can be marketed to successfully. The opening thrust of these campaigns is to get consumers to apply. The initial contact companies have with these consumers almost always comes in the form of an advertisement, so the value of the card needs to be quickly understood by the targeted population. This card must demonstrate a clear and immediate benefit. In order to separate one company's credit card from the clutter of other solicitations that card's benefits must be understandable in the first few moments the consumer comes into contact with the card's advertisement. The benefits must be apparent and instantly recognizable. This need for instant recognition requires that the card avoid complexity. Therefore, the success of the card in building a customer base hinges on the card's advantages being simple and uncomplicated.

The short term goal of a credit card company is to sign up desirable consumers, and this is accomplished through the advertising of benefits that are perceived as valuable and are clearly and instantly recognizable. The long-term goal is to keep consumers using the card by re-enforcing the perception of value. If a program is cumbersome to work with, the value of the program will lessen in the mind of the consumer. And if the benefit(s) of the program do not continue to be perceived highly, the consumer becomes motivated to switch cards. Therefore, to accomplish both the short and long term goal, the credit card program needs to be simple, allowing for an instantly recognizable benefit to the consumer, and the benefit needs to have a long lasting value that is attainable without undue effort by the consumer.

One group of consumers successfully marketed to today are those that carry balances, and the success derives from simplicity. Since the income streams from credit card balances carrying high interest rates are very attractive to companies, these companies simply hawk low introductory interest rates that are good for a limited time frame. They hope the customer will remain with them after this 'teaser' rate expires. For example, many companies mail solicitations advertising on the envelopes low introductory rates such as 2.9% good for a short time frame such as six months. These low interest rates, compared to the higher double-digit interest rates normally associated with credit cards, are immediately attractive to the balance-carrying consumer. Companies have found success in signing up these consumers because the main feature and appeal of the card is simply the low interest rate. But the shortcomings of this approach are that the low interest rate only lasts so long, and when the low rate ends the cardholder is motivated to switch cards. There are so many companies hawking this low 'teaser' rate and they've been hawking them for so long now that consumers are confident that when their 'teaser' rate expires, others will be available. These consumers will sign up with the intention of keeping their cards only during this introductory rate period and, hopefully, jump to another card when the low rate expires. Other shortcomings are that this segment of the population is limited to those that carry balances, and these consumers may not be the most desirable customer base for a credit card company.

Another method for attracting consumers, besides offering low interest rates, is through a reward system. In this, consumers earn rewards by using their credit cards. The more the consumer uses the card, the more 'points' or 'credits' or 'miles' or 'dollars' (herein called "points") earned and these are earned without apparent extra cost to the cardholder.

Credit card reward systems abound, each trying to create a successful market for themselves. The reward offers vary: cash back, free gifts and gift certificates, airline tickets, movie rentals, travel, theme park benefits, casino cash, and more. The short-term success of these cards requires signing up consumers. The long-term success requires keeping them. One key component to keeping consumers using a credit card with rewards is the continuance of the consumers' perception that the rewards are valuable, even after a reward is claimed.

One credit card reward system that markets somewhat successfully to a desirable target population provides awards for free airline travel. In marketing airline awards, the marketers can take advantage of the familiarity consumers have with the airline award programs. These programs, though somewhat complex, have been around for years so consumers already know not only that they must attain thresholds by amassing 'miles' through credit card use, but they also know the approximate thresholds necessary for the awards. This simplifies the marketing of these cards by allowing the advertisements to tout 'bonus miles' for signing up and starting to use the card. The 'bonus miles' are an instantly recognizable benefit to this target population.

The shortcomings of this program are: that the credit card companies' market is limited to those wanting to fly for free; a consumer's use for airline travel may change before accumulating enough 'miles' to fly for free; the selection of airlines available for free flights may be limited; the participating airlines may change their programs; and airlines may go out of business. Some of these conditions may leave a consumer with unused credits that could have been put to better use and the cardholder viewing the process as wasteful. Moreover, once a free flight is earned, the process involved in claiming and using the award can be cumbersome. The consumer may have to contend with blackout dates for travel, limited seating on each flight for passengers with flight awards, expiring 'miles', changing programs, etc. This can also motivate a consumer to change cards. Also, the consumer may earn a free flight, use the award, and notice that the cost to fly was low, changing the consumer's perception of the value of the free flight. In any of these examples, the consumer may become less enamored with the idea of earning free flights and decide to switch cards.

Other reward cards that have proven somewhat successful are the cards that offer rebates good on automobile purchases or leases. Two such cards are the GM Card and Citibank's Drivers Edge Card. These cards have some success in signing up consumers: consumers wanting a new car can use this card to reduce the car's cost. With the GM Card, a consumer is awarded points good towards the purchase or lease of a new GM car, or good towards airline flights or other awards that are part of this card's program. With Citibank's Drivers Edge Card, the consumer earns points good towards the purchase of any new car. The shortcomings of both cards are that they are desirable only to those wanting a new car and they have maximum rebates allowable per new car. GM's program maximum is $3,500, and depending on the model of the car desired, the 'Vehicle Redemption Allowance' may be even lower. The maximum allowable on the Citibank card is $1,500 per car. These maximums not only limit the amount of money the cardholder may save, but if there are points left over this may also appear wasteful. Another potential for wastefulness stems from the card's point expirations: seven years with the GM Card and three years with Citibank's. The wastefulness or the potential for wastefulness could upset a cardholder enough to motivate them to switch cards or to never sign up for the card in the first place. Also, the cardholder may find the redemption process cumbersome and anxiety producing, or they may not like the car they get, or they have no plans to get another car, thus reducing or eliminating the incentive to keep the card, motivating the consumer to switch cards.

Other shortcomings specific to the GM card are that only GM cars can be purchased or leased, thus limiting the appeal to consumers wanting GM vehicles. And the shortcomings of the GM Card's airline rewards are similar to the airline reward program shortcomings already mentioned. As for the consumer earning gifts or other awards within the GM Card reward program, this would be difficult to market to prospective cardholders. Although similar to the airline rewards in that they must reach certain thresholds to earn the reward, the consumer is not as familiar with these rewards and the thresholds necessary to earn them. This degree of complexity would make marketing these benefits in this highly competitive market difficult. Also, these rewards are limited in scope and don't appeal to everyone. And, again, the redemption process may prove cumbersome, unused points may be viewed as wasteful, and the rewards may be a disappointment after claiming them, lessening the perception of the value of the card and motivating the consumer to switch cards.

In the case of Gateway Computer's reward system, the consumer earns 'Moola Dollars' good for Gateway computers and computer products. The Gateway Moola Master Card Credit Card offers a 1% rebate on all transactions, with the rebate dollars converting into Moola Dollars. As each 25 Moola Dollars increment is attained, the Moola Dollars are mailed out to the cardholder. These are then good for the purchase of Gateway computers and equipment. Moola Dollars are good for five years after issuance.

The shortcomings of the Gateway card are that the consumer must be motivated to own Gateway computers or products, limiting the market for this card. Also, the Moola Dollars have time constraints, and have thresholds that must be met, creating the potential for unused earnings and a perception of wastefulness by the consumer. Any wastefulness or disappointment in the products or lack of need for Gateway products can motivate the consumer to switch cards.

The Salomon Smith Barney MasterCard FMA Card awards one point for each dollar spent. The points are redeemable for many awards such as flights on different airlines, gifts and gift certificates, and other goods and services. Unpaid balances can be paid by a stock trading account that is linked with the card. The stock account borrows money on margin to pay the bill, usually at rates close to the Prime Rate. Because this card offers free flight rewards, the marketing of this card could be easy, however, the shortcomings of this card are that it requires a Financial Management Account with Smith Barney, thus limiting the available market. And again, the airline awards have shortcomings that have already been mentioned as have the shortcomings on the other rewards such as gifts, gift certificates and other rewards in this card's system.

Other cards that are simple and somewhat marketable are the cash rebate cards. The cards simply rebate a percentage of transactions to the cardholder. The Discover Card and the American Express Platinum Rebate Card offer a cash rebate paid annually. The amount of rebate can vary: different thresholds have different percentages of rebate with the higher thresholds paying higher percentages. The highest rebate with the Discover Card is 1%; the highest rebate with the American Express Platinum Rebate Card is 2%, but only if the consumer is carrying a balance. Otherwise, the maximum is 1.5%.

The shortcomings of the Discover Card and the American Express Platinum Rebate Card are that the rebates occur only once per year at a specified anniversary date and that the rebate percentage varies due to transaction thresholds. Some consumers, when they apply, may believe that the rebate is at the percentage quoted. The percentage usually quoted is the maximum, but that maximum threshold may take a long time to reach, if ever, because the next annual cycle restarts the transacted amounts at zero. The consumer may feel misled and frustrated by this. Also, with the rebate being paid only once per year, the rebate, as it accumulates, doesn't earn interest, thus depriving the consumer of potential earnings. Lastly, although the cash rebate can be used for useful purposes, when the cash rebate check arrives it can be spent wastefully as well. Wasteful use of a cash rebate, as well as the other shortcomings mentioned, may lead a consumer to perceive the card as less valuable than before and switch to one with a higher perceived value.

Another program rewards the consumer with U.S. Savings Bonds. This card markets to consumers wanting to save for college. Points accumulate at the rate of one per dollar transacted, and for every 2500 points the primary cardholder gets a $25 Series EE U.S. Savings Bond. One advantage of using the bonds for college education is that the earnings may be exempt from not only state and local taxes, but federal taxes as well. The shortcomings here are that the rewards are limited to savings bonds, and even though the bonds are targeted for college expenses, there are instances that may lead to wastefulness, real and perceived, motivating the consumer to switch cards. First, the consumer has the ability to use them for any purpose, even wasteful expenditures. Second, the points, prior to the issuance of the bond, do not earn interest, depriving the consumer of potential earnings. Lastly, the bonds can only be redeemed after six months of the issue date, and even though they earn interest during this period, the consumer may have a better use for the funds.

Another shortcoming is that the bonds can only be issued to the primary cardholder, and the federal tax break only applies for tuition and expenses at post-secondary institutions and only for the cardholder or the cardholder's spouse or any dependent, and the bond must be redeemed in the same calendar year that the tuition and fees are paid. The marketing of this program appears easy at first, but because of the lack of familiarity for consumers and complications inherent in the redemption/tax exemption process, the benefits may not be instantly recognizable to some consumers. And even though this is a desirable population to target, the complications of the program may limit the number of consumers that apply. Also, some consumers may not have a need for secondary education for themselves or their immediate family; and because the bonds reach maturity in 18 years, the full value of the bonds may not be realized when they are needed or they may never be needed at all, thus depriving the consumer of an earnings and raising the appearance of wastefulness. Finally, a family may have a child, and participate in this bond reward program for four or five years before assuming that any more bonds will not have the value desired. Any wastefulness, perceived or otherwise, will motivate the consumer to switch cards.

Another cash rebate card with interesting features is the TD Waterhouse Investors Prime Credit Card. With this card, a 1% rebate on all purchases is applied as cash credit to the consumer's TD Waterhouse Brokerage Account. These cash credits accumulate, don't earn interest until they become available, and become available in January. They become available for a variety of uses: a consumer may request a check to be mailed to them, or the cash becomes available within the TD Waterhouse Brokerage Account system. Uses for the cash within the system may be for stock purchases, paying bills, other investments, etc.

Even though the marketing of the cash rebate is simple, the shortcomings for this card are that the market is limited to those with a TD Waterhouse Brokerage Account. Also, cash credits from transactions sit in an account not earning interest, depriving the consumer of potential earnings, and even though the consumer may eventually use the cash rebate to pay bills including a mortgage, the system does not promote this use. The cash rebate may be used foolishly. Foolish or wasteful use of a rebate may lead a consumer to switch to another card, possibly one that limits the rebate uses to ones that are perceived as more practical.

The NetBank Platinum Visa card is another cash rebate card that rebates as much as 5% from all purchases through select online merchants. The advantage here is that the consumer gets the rebate monthly, but the rebate simply pays part of the credit card bill. The shortcomings of this card are that all rebates stem only from purchases from select online merchants. Also, the cardholder may have better use for the rebate. Should the cardholder become frustrated by the limited selection of online merchants and their merchandise, or should the cardholder perceive that the rebates would be more useful and less wasteful elsewhere, the cardholder will be motivated to switch cards.

Other credit cards that provide a discount on the monthly bills and are easily marketed are the 'instant' discount merchant credit cards. These offer a discount of about 10% on all purchases made the first day of purchases on a new credit card account. In most cases, the discount appears on the first bill the consumer receives. A valuable enticement is the instant approval at the cash register for desirable consumers who don't yet have that merchant's credit card. And although the value is instantly recognizable to the consumer, the shortcomings of this card program are that the card's market is limited to those that shop at that establishment, and the card can only be used at that merchant. Also, consumers may only want to use the card once and that for the first day of purchases because of the 'first day only' constraint.

Some of these merchants may offer, after that 'first day only' discount, 'instant' discounts of 10% 'for this week only'. Again, a shortcoming is that the cardholder may only want to use the card during this discount period. Since use of this card, at times outside of these discounts, offers no reward to the cardholder, the cardholder will be motivated to switch to another card even for purchases at that establishment.

Reward programs for credit cards abound. The credit card business has proliferated to nearly 7,000 credit card issuers with the average household having four credit cards. The competition is rife with reward programs, all having a similar formula: transactions yield points, and these accumulate until thresholds are met and rewards claimed.

A tactic for helping the cardholder attain thresholds faster is through the sharing of an account with someone else. With more cardholders' transactions, points accumulate faster and thresholds are reached sooner. The shortcomings of sharing an account with someone else in order to accumulate points faster, are that the maximum number of cardholders per account is usually limited to a maximum of three or four. And those others on the account share not only the points, but also share the liabilities and the credit limit. If these cardholders reach the credit limit, this may limit further purchases and the potential for more points. By sharing the liabilities, should one cardholder not pay their share due to job loss or illness or irresponsibility, all other cardholders on that account are each fully liable for paying the bill.

Other credit cards that have some market appeal are those linked to donations. These cards also carry a marketable concept that is simple: use the card and donate money to a charity at no extra cost to the cardholder. The Working Assets Visa or MasterCard, donates ten cents each time the card is used to nonprofit groups working for peace, human rights, equality, education and the environment. This card also carries a cash rebate feature. If the cardholder uses this credit card to purchase items through merchants at ShopForChange.com, the cardholder can earn a rebate from 1-5% of the transaction amount. The shortcomings of this card are that the charitable options are limited and may not appeal to the consumer and the funds donated as a result of card use carry no tax benefit for the cardholder. Also, the cash rebates are paid annually and the credits sit in the account without earning interest. This deprives the cardholder of potential earnings. Other shortcomings are that the perceived value of the charitable donations and the cash rebate may change, motivating the cardholder to switch cards.

The Elton John AIDS Foundation Visa Credit Card donates money to this charity with every new account opened and every purchase made. Another card, the Pet Assure Master Card, donates a percentage of all purchases, balance transfers, and cash advances each month to participating animal organizations. It also offers discounts at participating veterinarians and other pet care providers. One other, the AKC Visa donates to the American Kennel Club, transactions translate into donations. The First USA Green Mountain.com Platinum Visa Card donates a portion of each transaction to promote wind or solar power.

The shortcomings of these cards are that the charitable options are limited and may not appeal to the consumer masses, and the funds donated as a result of card use carry no tax benefit for the cardholder. Also, as in the case of the Pet Assure Master Card, the perceived value of donating money for animal causes and the value of discounts for pet care may wane when the pet dies or the feelings for the pet changes. These shortcomings may lead to the consumer switching cards.

Other separate art, apparently viewed separately, comes from the mortgage arena, where there have been attempts to capture and keep consumers through free flight reward programs. Two such programs offer 'miles' for transacting a mortgage. Companies such as North American Mortgage Company and Countrywide Mortgage credit 1,000 miles for every $10,000 financed. The marketing of this program seems simple, and getting a mortgage shopper to examine the offer seems likely. But this program gets complicated because the consumer will want to compare the mortgage rate and costs in order to determine the value of the benefits. The shortcomings of these mortgage reward programs are that they are complicated and take time for the consumer to ascertain whether they're worthwhile, making the marketing of such a program more difficult. Also, these offers are limited to those looking to buy or refinance a property. And the shortcomings associated with flight reward programs already mentioned in connection with credit cards, applies here as well.

Other mortgage businesses with related art features are those that promote a more rapid pay down of the mortgage balance. These programs have different names, the most popular name being 'The bi-weekly mortgage'. A program being marketed to it's clientele comes from Washington Mutual Bank is named of the program is the 'Equity Accelerator Program'. Here the consumer, who has a Washington Mutual mortgage, signs up and allows for an automatic debit to occur every two weeks. The debits go into an account that automatically pays the monthly mortgage payment on the due date. Because some months have more than four weeks in them, by the end of the year the consumer has enough money in the account to make an extra mortgage payment. By making 13 full mortgage payments in a year instead of 12, the mortgage principle balance is reduced faster than if the consumer followed the regular payment schedule, paying off a 30 year loan in about 24.5 years. The shortcomings of this program are that the program costs $295 to sign up and carries a $5 monthly fee. Also, the payments come out of the consumer's pocket, not from a credit card reward program that generates payments at no cost to the consumer.

There have been other bi-weekly mortgage programs offered, but these seem to have declined in popularity because the payments went from the consumer to a third party company other than the mortgage servicer, that would collect money from the consumer with the agreement to send to the mortgage servicer the payments correctly and on time. However, at times the payments were late, wrong, or non-existent. The shortcomings of these programs are that consumers lost trust in the outside companies to fulfill their responsibilities.

Another mortgage program with related art are home equity lines that can be accessed using a credit card. In this program, First Union offers a Prime Equity Line, and Washington Mutual offers the 'On The House' Platinum Visa card that allows the consumer the ability to borrow money from the home equity line that is a second mortgage secured by the property. The interest rate charged on this card, which is secured credit rather than unsecured credit, is usually lower than the normal interest rates charged on unsecured credit cards. It is possible that because the card borrows money from the home equity line for unpaid balances, the interest payment would be tax deductible. The shortcomings of this program are that the mortgage debt, rather than shrinking, is actually increasing. Also, the cardholder must have a home equity line with this institution and home equity lines may not be available in the state the consumer lives in. Also, since the card is secured by the property, not unsecured like most credit cards, the cardholder may loose the property in the event of default on the credit card debt.

Another related art business practice involves the allocation of assets. American Express has the 'Asset Allocation Tool' that queries consumers via their web site on their present financial situation and preferences. This yields a basic recommended investment portfolio mix. Should the consumer wish a more detailed analysis, there is available through American Express financial advisors an advanced investment portfolio mix. There is even a section on Educational Goals, meant to plan for college expenses. The shortcomings of this service are that the recommendations may yield less than desired results because certain investments do not guarantee returns. Another is that this is a time consuming process, and at the end, the results are guesses that are not guaranteed.

Of course there are many patents reflecting the aforementioned drive to market cards. For example, U.S. Pat. No. 6,018,718 (Walker) provides and manages a customized reward offer to a holder of a financial account. Here, a consumer with a financial account prioritizes where the rewards from credit cards will go based on performance targets. The shortcomings are that the consumer must have a financial account, and even with one, the consumer must then spend time developing performance targets.

U.S. Pat. No. 6,018,718 (Walker) provides for the mining of consumer financial account information and based on performance targets selecting which reward offer suits a particular consumer.

U.S. Pat. No. 5,466,919 enables a credit cardholder to make donations to cardholder-selected charities any time a transaction occurs.

U.S. Pat. No. 5,911,135 (Atkins 1) provides a personal financial management program that can allocate funds to maximize returns based on the consumer's personal financial targets. For example, the central structural element of the financial account is the client's mortgage, and this allows a client to reallocate funds normally intended to pay the principle on a mortgage to other investments or U.S. Pat. No. 5,911,136 (Atkins 2) is a system for prioritized operation of a personal financial account comprising liabilities and investments. U.S. Pat. No. 5,864,828 (Atkins 3) is another financial planning management system, and U.S. Pat. No. 5,884,285 (Atkins 4) is a system for managing financial accounts by reallocating funds among accounts. U.S. Pat. No. 5,852,811 (Atkins 5) is a method for managing financial accounts by a preferred allocation of funds among accounts, and U.S. Pat. No. 5,875,437 (Atkins 6) is a system for the operation and management of one or more financial accounts through the use of a digital communication and computation system for exchange, investment, and borrowing.

U.S. Pat. No. 5,745,706 (Wolfberg) is a system and related equipment for spending and investment account management.

U.S. Pat. No. 5,991,736 (Ferguson) provides a patronage incentive award system incorporating retirement accounts and method thereof. Pays into the consumer's retirement account.

U.S. Pat. No. 4,750,119 (Cohen) discusses a purchasing system with rebate feature . . . the base patent for rebates from transactions. Also allows for a guarantee of future rebates to be issued by an insurance company selling annuity contracts.

U.S. Pat. No. 5,202,826 (McCarthy) establishes a centralized cash value accumulation system for multiple merchants in which there is an accumulating of cash value based on transactions for cash rebates, and U.S. Pat. No. 5,117,355 (McCarthy) is much the same as above, as is U.S. Pat. No. 5,287,268 (McCarthy).

U.S. Pat. No. 5,621,640 (Burke) provides an automatic philanthropic contribution system. At a sales establishment, product prices are entered into a cash register and when a product is purchased, the difference between the amount paid and the price is automatically paid to a charity.

U.S. Pat. No. 5,537,314 (Kanter) somehow integrates reward systems with multi-level marketing programs.

U.S. Pat. No. 5,970,480 (Kalina) provides rewards from transactions go towards purchase of mutual funds and/or investment vehicle of cardholder choice. U.S. Pat. No. 5,025,372 (Burton) provides a system in which rebates directly to the credit instrument (credit card).

Another related art business practice involves 'bidding' for mortgages. Two popular mortgage 'bidding' businesses are LendingTree.com and priceline.com. LendingTree.com requires the consumer to give them the appropriate information and they respond with loans that may or may not appeal to the consumer. Priceline.com asks the consumer to state the rate and terms the consumer wishes, and they try to match that or give them four other options to choose from. The shortcomings of these businesses are that the consumer must enter their own information and wait to get a response. The process can be cumbersome and time consuming. Loan options are limited to those that work with these businesses. Also, the next time the consumer wants a loan, they must go through the process again. This creates a redundancy in work and in fees.

As part of the previous related art, is the practice of originating and closing mortgages and packaging them for sale. In most cases, there is a standard mortgage package that must be created to process, underwrite, close, and sell the mortgage. This package consists of many separate parts from the appraisal to income verifications to surveys and title insurance. The shortcomings of the package described are that they are packages of paperwork that must be collected from different entities and systematically assembled. They are bulky and difficult to store and manage. Should a consumer ever wish to refinance this mortgage, in almost all cases and entirely new package must be assembled even though most of the disparate parts are the same as in the previous package.

Also relating to this is the current MP3 trend facilitated by the creation of e-files that can easily transfer music from one computer to another. In this, music is recorded digitally, compressed, and placed in an e-file that other listeners can access either through a network like Napster's or through one like Gnutella's. These applications are called 'peer-to-peer' file sharing. The shortcomings of this are that they deal strictly with the music industry and this technology is for compressing audio. Also, the network is geared for sharing these files between listeners and not necessarily for marketing to those listeners. Also, any marketing that can be done between listeners and companies doesn't include interchangeable parts, which allows for a greater number of companies to be involved in marketing to this audience.

In sum, the industry has worked long and hard to sell cards, yet the known prior art has shortcomings that have left many inadequately addressed needs.

OBJECTS AND ADVANTAGES

In view of the foregoing, an object of the invention for which a patent is sought is improve over or overcoming some or all of the drawbacks indicated herein.

It is an object of the present invention to provide a computer system linked to credit card activity to reduce mortgages.

It is another object of the present invention to provide an allocation system of the mortgage payment over the Internet.

It is still another object of the present invention to provide a convenient method for payment of mortgages in combination with a card.

It is yet another object of the present invention to provide an efficient method to reduce mortgage principle.

It is a further object of the present invention to provide an electronic file of the mortgage for easier financing for the future.

It is still a further object of the present invention to provide an electronic file of the mortgage for easier and more efficient solicitation of mortgages, insurance, title insurance, and other mortgage related businesses.

It is yet a further object of the present invention to provide an electronic file of the mortgage for easier trading of mortgages.

It is an additional object of the present invention to provide an electronic file of the mortgage for easier information access for the consumer.

It is yet an additional object of the present invention to provide a computer-aided and more efficient marketing program for credit card issuers to a highly desirable population of consumers.

It is still an additional object of the present invention to provide a less cumbersome reward system, even implemented in real time, sustaining the consumer's perspective of the value of the credit card thus increasing the likelihood of retaining the consumer's business.

It is an ever further object of the present invention to provide a method for alleviating the affordable housing problem.

It is yet an ever further object of the present invention to provide a method for low income homeowners to improve their financial status through mortgage reduction.

It is still yet an ever further object of the present invention to provide a method to allow for payment of other homeowners' mortgages, increasing the likelihood that the credits obtained from the credit card activity will be put to good use and increasing the likelihood that the consumer will continue as a cardholder.

It is more over an object of the present invention to provide a method for friends and family to help a loved one pay down their mortgage through their credit card activity.

These and other objects and advantages of this invention will become apparent from a consideration of the figures and ensuing description in contrast to the state of the art before the present invention.

SUMMARY OF THE INVENTION

These and the other objects of the present invention, as apparent from the specification as a whole, are carried out by providing an improved digital electrical computer-based system configured to address the foregoing objects, including a machine (programmed computer), methods for making and using it, products produced by the method, data structures, and necessary intermediates, collectively referenced herein after as the method (for the sake of brevity). Accordingly the invention can be exemplified as a computer-aided method such as that for card (bank, credit, debit, or the like) activity-based mortgage crediting.

More particularly, the foregoing can be carried out by steps including: associating card activity with a mortgage of a cardholder; crediting an amount to the mortgage responsive to the card activity; and generating output including the charge card activity-based mortgage crediting; wherein at least some of the steps are carried out by a digital electrical computer.

In any of the embodiments, the method can be carried out further including the step of: communicating a funds transfer to the cardholder.

In any of the embodiments, the method can be carried out with the step of communicating including: printing a check for the amount; printing a coupon with the amount for carrying out payment of the mortgage with the check; and combining the check and the coupon with a statement of the card activity in an envelope so as to address the envelope to the cardholder.

In any of the embodiments, the method can be carried out further including the step of: communicating a funds transfer to a mortgage servicer.

In any of the embodiments, the method can be carried out such that the communicating includes an electronic funds transfer.

In any of the embodiments, the method can be carried out the communicating includes: printing a check for the amount; printing a coupon with the amount for carrying out payment of the mortgage with the check; and combining the check and the coupon with a statement of the card activity in an envelope so as to address the envelope to the mortgage servicer.

In any of the embodiments, the method can be carried out further including the step of: computing a forecast for repayment of the mortgage from the card activity; and wherein: the step of generating output includes generating output including the forecast.

In any of the embodiments, the method can be carried out further including the step of: communicating the forecast to the cardholder.

In any of the embodiments, the method can be carried out further including the step of: changing an allocation of the credit activity with the mortgage in response to an instruction from the cardholder.

In any of the embodiments, the method can be carried out further including the step of: changing an allocation of the credit activity between the mortgage and a second mortgage in response to an instruction from the cardholder.

In any of the embodiments, the method can be carried out further including the step of: changing an allocation of the credit activity between interest and principle for the mortgage in response to an instruction from the cardholder.

In any of the embodiments, the method can be carried out further including the step of: changing an allocation of the credit activity with the mortgage in response to an instruction from the mortgage holder.

In any of the embodiments, the method can be carried out further including the step of: changing an allocation of the credit activity between the mortgage and a second mortgage in response to an instruction from the mortgage holder.

In any of the embodiments, the method can be carried out further including the step of: changing an allocation of the credit activity between interest and principle for the mortgage in response to an instruction from the mortgage holder.

In any of the embodiments, the method can be carried out such that the step of changing is carried out in response to the instruction from the mortgage holder received over a network.

In any of the embodiments, the method can be carried out further including: allocating a portion of the credit activity between the mortgage and a charity; and issuing a tax deduction statement to the cardholder.

In any of the embodiments, the method can be carried out further including the steps of: computing an annual statement of said crediting; and communicating the annual statement to the cardholder.

In any of the embodiments, the method can be carried out such that the step of computing an annual statement includes: computing mortgage interest paid by the crediting.

In any of the embodiments, the method can be carried out further including the steps of: associating a monthly payment with the mortgage; and communicating a funds transfer including the payment to a mortgage servicer.

In any of the embodiments, the method can be carried out further including the steps of: associating an allocation of the credit activity with the mortgage and with a second mortgage of the cardholder; wherein the step of crediting the amount to the mortgage is also responsive to the allocation; and further including crediting a second amount to the second mortgage responsive to the allocation; wherein the step of generating the output includes generating the output including the crediting a second amount to the second mortgage.

In any of the embodiments, the method can be carried out further including the step of: associating the mortgage with second card activity of a second cardholder; crediting an amount to the mortgage responsive to the second card activity; and wherein the step of generating output includes generating the output including the second charge card activity-based mortgage crediting.

In any of the embodiments, the method can be carried out further including the step of: generating second output including the second charge card activity-based mortgage crediting, but not including the card activity of the cardholder of the mortgage; and communicating the second output to the second cardholder.

In any of the embodiments, the method can be carried out further including the step of: communicating a funds transfer to a charity for payment of the mortgage.

In any of the embodiments, the method can be carried out further including the step of: using a second computer to compute a valuation of a mortgage-backed security in response to indicia of said crediting.

In any of the embodiments, the method can be carried out, or perhaps viewed differently as a method for carrying out card activity-based mortgage crediting, the method including the steps of: forming a combination in an envelope, the combination including at least two of: a check printed with an amount to pay a mortgage, said amount determined by crediting responsive to card activity of a cardholder; a coupon printed with the amount for making the payment of the mortgage with the check; and a statement of showing the card activity and the crediting.

In any of the embodiments, the method can be carried out such that the step of forming includes three of said check, said coupon and said statement; and further including the step of: printing an address on the envelope so as to address the envelope to the cardholder.

In any of the embodiments, the method can be carried out such that the step of forming is carried out with at least two of said check and said coupon; and further including the steps of: printing an address on the envelope so as to address the envelope to a mortgage servicer; combining said statement with a second envelope; and printing an address on the second envelope so as to address the second envelope to the cardholder.

In any of the embodiments, the method can be carried out, or perhaps viewed differently as a method for making a digital electrical computer system corresponding to carrying out one or more activities indicated herein, for example, programmed for carrying out card activity-based mortgage crediting.

In any of the embodiments, the method can be carried out including the steps of: providing a digital electrical computer and data processing system comprising a digital electrical computer electrically connected to an input device for inputting data and to an output device; and programming the digital electrical computer to associate card activity with a mortgage of a cardholder, to credit an amount to the mortgage responsive to the card activity, and to generate output including the charge card activity-based mortgage crediting, to form the digital electrical computer system programmed for carrying out card activity-based mortgage crediting.

In any of the embodiments, the method can be carried out such that the programming includes programming the digital electrical computer to trigger an electronic funds transfer to another digital electrical computer.

In any of the embodiments, the method can be carried out

In any of the embodiments, the method can be carried out, or perhaps viewed differently as a digital electrical computer system programmed for carrying out card activity-based mortgage crediting, the computer system including: a digital electrical computer and data processing system comprising a digital electrical computer electrically connected to an input device for inputting data and to an output device, said digital electrical computer programmed to associate card activity with a mortgage of a cardholder, to credit an amount to the mortgage responsive to the card activity, and to generate output including the charge card activity-based mortgage crediting, said output including at least two of: a check printed with an amount to pay a mortgage, said amount determined by crediting responsive to card activity of a cardholder; a coupon printed with the amount for making the payment of the mortgage with the check; and a statement of showing the card activity and the crediting.

In any of the embodiments, the method can be carried out, or perhaps viewed differently as a method for carrying out computerized card activity-based mortgage crediting, the method including the step of: crediting card activity to a mortgage payment in response to an instruction from a mortgage holder received over the Internet.

In any of the embodiments, the method can be carried out, or perhaps viewed differently as a method for carrying out adjusting an allocation for a mortgage payment, for example, between principal and interest, or as between mortgages or in an amount such as pay off or more rapid or slower payment, from the mortgage holder.

BRIEF DESCRIPTION OF THE DRAWINGS

FIG. 1 is an illustration of an embodiment of the present invention focussing on hardware features;

FIG. 2 is an illustration of a flow chart for an embodiment of the present invention;

FIG. 3 is an illustration of a flow chart for an embodiment of the present invention;

FIG. 4 is an illustration of a flow chart for an embodiment of the present invention;

FIG. 5 is an illustration of a flow chart for an embodiment of the present invention;

FIG. 6 is an illustration of a flow chart for an embodiment of the present invention;

FIG. 7 is an illustration of a flow chart for an embodiment of the present invention;

FIG. 8 is an illustration of a flow chart for an embodiment of the present invention.

FIG. 9 is an illustration of a flow chart for an embodiment of the present invention;

FIG. 10 is an illustration of a flow chart for an embodiment of the present invention.

FIG. 11 is an illustration of a flow chart for an embodiment of the present invention;

FIG. 12 is an illustration of a flow chart for an embodiment of the present invention;

FIG. 13 is an illustration of a flow chart for an embodiment of the present invention;

FIG. 14 is an illustration of a flow chart for an embodiment of the present invention.

FIG. 15 is an illustration of a flow chart for an embodiment of the present invention;

FIG. 16 is an illustration of a flow chart for an embodiment of the present invention.

FIG. 17 is an illustration of a flow chart for an embodiment of the present invention;

FIG. 18 is an illustration of a flow chart for an embodiment of the present invention;

FIG. 19 is an illustration of a flow chart for an embodiment of the present invention; and FIG. 20 is an illustration of a flow chart for an embodiment of the present invention.

DETAILED DESCRIPTION OF A PREFERRED EMBODIMENT

FIG. 1 shows, in block diagram form, the computer-based elements, which can be utilized to implement the present invention. FIG. 1 is an overview of the complete invention. There are eleven components to the invention, in the present embodiment:

1 Data Input Screens & Terminal (1)

Terminal 1 represents computers and computer screens used to enter data into the invention, and to view data posted to the system. Virtually any current or recent model personal computer platform may be employed. A typical Cardholder (2) Data Input Screen could be an iMac personal computer connected to an Internet network interface using built-in 56K or Ethernet Internet Protocols. A typical Customer Service/Telco (3) Data Input Screen could be a Gateway 2000 PC running Windows 2000, a 16" Radius monitor, and a Local or Wide Area Network Ethernet connection to an internet network interface. Similarly, Customer Service/Mail (4) could be a Gateway 2000 PC running Windows 2000, a 20" Radius intelliColor e monitor, and a Local or Wide Area Network Ethernet connection to an Internet network interface Frequently, the description will refer to the "user", meaning the invention is being accessed using a network-enabled computer by the cardholder, a Telco representative, or a Mail representative.

2 Network Communications Systems (5)

With regard to Network Communications Systems (5), any 'upstream' Internet Service Provider (ISP) utilizing TCP/IP to transmit data between Data Input Screens. Examples of ISPs include uunet, starnetusa, and Exodus. Well-known and accepted protocols may be used.

3 Central Processor & Digital Computer (7)

Central Processor & Digital Computer (7) represents the electrical computing devices that receive, process, store, analyze and distribute data. The inventors reasonably expect that numerous computing devices will be employed as business volume grows. The Central Processor and Digital Computer can be comprised of these components:

one or more CPUs (Central Processing Units);

one or more digital computers commonly referred to as "servers" ("servers" are the gateway between Local Area and Wide Area digital computers);

Data storage (hard drives)

Routers;

Applications, such as web browsers, word processors, database engines, etc.

4 Mortgagee and Mortgage Data (6)

Mortgagee & Mortgage Data (6) represents third-party data sent via Electronic File Transfer (EFT) and a TCP/IP network communications system (5). Mortgages serviced by the invention will on occasion be bought and sold by mortgage provisioners. Interaction with mortgage provisioners is necessarily to enable the invention—i.e., to facilitate the payment of credits (see FIG. 16), and also to compute a valuation of a mortgage-based security in response to indicia of said crediting. Mortgages serviced by the invention will on occasion be solicited by other mortgage provisioners offering more attractive rates and/or terms 5 Help (8)

Help (8) represents the 'how-to' and troubleshooting guide available at all times to cardholders, cardholder applicants, and customer service representatives. It is accessed via a web browser, such as version 4 or better of either Microsoft Internet Explorer or Netscape Navigator. Help is context-enabled, indexed, and searchable by keyword and phrase.

6 Cardholder Account Registration (9)

Cardholder Account Registration (9, see FIGS. 2, 3, 4) illustrates how cardholder applicants can begin the mortgage-crediting process. In this exemplary description, cardholders, cardholder representatives, and user all refer to persons directly employing a network-enabled computer to access the invention.

7 Cardholder Transaction Function (11)

7 Cardholder Transaction Function (11, FIG. 5) shows how credit or other card transaction activity is typically managed through a third party and transmitted to the invention, where appropriate credits are determined and issued.

8 Cardholder Credits Function (12)

8 Cardholder Credits Function (12, FIG. 16) illustrates important functions of the invention. Transaction data received from FIG. 200 functions are processed and applied, subject to criteria established by the cardholder, the card provider, other cardholders, and mortgagees.

9 Cardholder Settings (10)

8 Cardholder Credits Function (12, FIG. 16) shows how the cardholder manages his/her credit transfers through Cardholder Settings. The Cardholder may alter his/her Settings at any time, either directly via a Data Input Screen (2), or by using either Customer Service/Telco (3) or Customer Service/Mail (4) representative as an intermediary.

10 Reporting Function (13)

10 Reporting Function (13, FIG. 17,18,19) illustrates a way for carrying out due diligence functions of the invention: (1) cardholder statement generating; (2) tax compliance and document generating; (3) third party information exchange & verification.

11 Subscriber Database (14)

11 Subscriber Database (14) illustrates a representative central storage system for all individual cardholder data.

Turning now to the Cardholder Account Registration Function (FIG. 2), there is illustrated a cardholder application, approval, and activation process.

Application

Use of the invention can involve a user to applying for a credit or other such card. Typically, applications are managed via third-party credit card from provisioners such as MBNA, VISA, FirstUnion, and many others. A cardholder or cardholder applicant may utilize the invention in one of three exemplary methods:

via Data Input Screen at Terminal (1)

Using a network-enabled computer, such as a PowerPC604e and Apple Cinema display, the cardholder links to the invention network site.

by telephone, or telephone-adaptive device, such as TDD (16)

Using his or her touch-tone phone or TDD, the customer interacts with Customer Service Center/Telco representatives (3).

a printed application (18), which the applicant submits via mail

Mailed applications are processed by Customer Service/Mail representatives (4) and entered as input into the terminal 1.

Regardless of its source, all incoming applications are routed through Network Communications Systems (5) to the Central Processor Digital Computer (7), where the application information (FIG. 3) is requested, entered, and submitted.

Turn now to the Cardholder Account Registration: Credit Card Provisioner Registration Process (FIG. 3). The list of requested information stated in FIG. 3 (at Block 20), constitutes information requested from a credit card applicant by the provisioner. For the purposes of this embodiment of the invention, the following line items should be requested:

First Name, Middle Name, Last Name, Street Address, City, State (22);

Zip Code (24);

E-mail address (26); and

Home Phone (28).

Once the application has been submitted (in one way or another) electronically, it is reviewed and either approved or rejected (30). As noted earlier, this is a third-party process, including issuance of a credit card number.

If rejected, standard protocols call for the generation of a refusal letter, which is mailed to the applicant (32). If accepted, then applicant information is transmitted from the card provisioner to the invention (34). Here, the invention can execute some important functions.

1 Cardholder Datafile (42)

The invention generates a timestamp ID for the Cardholder Datafile (42). The timestamp ID is a temporary name for the data file, and also will be used by the applicant as a temporary password. Application data supplied by the credit card provisioner (20) is transmitted into the file (42). Typically, this data is transmitted as a text file using a common data field delineation procedure and Electronic Data Interface (EDI) Internet Protocols. In addition to application information, it includes credit card number, credit limit, and expiration date.

2. Unique Email and Data File Name (36)

Computer code is employed to parse information requested in Elements 22 and 26, generating a unique email address for the new cardholder. For example, a new cardholder provides the following data (20):

| | |
|---|---|
| Name: | Phillip |
| Middle: | [null] |
| Last: | Carragher |
| Street Address: | 970 East Lane |
| City: | Windsor |
| State: | CO |

The invention generates the unique email: Phillip_Carragher_970EastLane_Windsor_CO@mail.mortgagebuyers.com The Central Processor (7) searches the subscriber database (14) for duplicate addresses. In the highly unlikely event that a duplicate is found, the CPU will modify the email address by altering the mail server name, e.g., Phillip_Carragher_970EastLane_Windsor_CO@mail2.mortgagebuyers.com. If that address is also a duplicate, the invention will continue to search for the first available unique address, e.g.: Phillip_Carragher_970EastLane_Windsor_CO@mail3.mortgagebuyers.com, etc.

At no time will the cardholder/applicant see an error message appear on screen advising that another user has already taken a submitted ID. Once a non-duplicate address is ascertained, the Central Processor (7) replaces the time stamp ID in the cardholder data file (42) with the newly generated email address.

3. Existing Email Verification and Redirect. (36)

The Central Processor (7) reads the email field of the cardholder's application (26). If the field value is not [null], a mail filter inserts the field value into the cc: field parameters for all outbound cardholder email (see FIG. 8). If the field value is [null], the cardholder data file (42) is flagged as 'non-email accessible.' No value is entered in the cc: field parameter.

4. Public Key Generation (38)

An important component of the invention is security—e.g., the generation of a Public Key, which may be used by cardholders to contact and transact with other cardholders. The Public Key is therefore not a 'secret' password. However, in order to preserve the privacy of cardholders, the Public Key is not a readily discernable key combination, such as a name, address, credit card number or social security number.

Each Public Key can be parsed from the Home Phone (28) and Zip Code (24) data contained the user application (20). For example:
Home Phone: 970-686-0332
Zip Code: 33245
Generates a Public Key Code of 686033233245. The generated Public Code is stored in the user data file (42). The Public Code is managed using the Public Code Status (FIG. 19) interface. [NOTE: special settings for the Public Code may be enabled (FIG. 19) following completion of the cardholder application, approval and activation process.]

5. Balance Transfer and Other Awards (40)

The invention operator, credit provisioners and/or third parties may from time to time elect to award new approved applicants with credits, special rates, or other awards. These are promotional items serving as inducements to apply. It is anticipated such offers will be advertised. It is further assumed that the awards, their relative value, and their availability, will change from time to time. Awarded credits are reported to the cardholder at FIG. 17, Available Credits (484).

6. Mortgagee Data Transfer Authorization (43)

This function relates to implementation of 'loan auctioning.' The Cardholder (2) authorizes or prohibits the invention from retrieving the cardholder's (2) complete electronic mortgage file from his/her mortgage provisioner (6). If the cardholder prohibits the transfer, no further action is taken. If enabled ("YES"), the invention requests the data transfer (6, FIG. 1). The cardholder (2) may link to FIG. 20, Auction Management, to establish opt-in criteria. At this time, the invention has processed and stored an approved cardholder's application information. An email address and account has been generated. A public key has been created. Awards, if any, have been credited. Mortgage Data Transfer has been authorized or disallowed.

7. Authorization

The cardholder now may activate the account (FIG. 4). All cardholders receive an Applicant Acceptance Notification (44) that contains their new credit card number(s), credit information, billing information, authorization information and Public Key (38). The Notification (44) is delivered in three forms: (i) a Postal Mail package (46), which contains the above information, as well as the physical credit card(s), is sent to all cardholders; (ii) email (48), is transmitted to all new user email accounts, wherein the email contains the same information as the letter; and/or (iii) in lieu of the card, cardholders receive the information necessary to activate and use the card immediately online and for other cardless credit purchases (e.g., catalog ordering), and of course the card(s) can be sent via the Postal Mail package (46).

Cardholders who applied via telephone using a Customer Service/Telco representative (3), similarly receive the mail letter and email described above. The Telco representative relay information (including card number[s]) to the user. All users can eventually receive their physical credit card(s) via the Postal Mail package (46).

The invention now authorizes card use (50). Authorization may take place immediately upon completion of the just-described Approval process, or at any time subsequently. In either case—immediate or delayed authorization—authorization is performed via computer, either by the cardholder online (2), or via Customer Service/Telco (3).

In the former case (2), the cardholder uses his or her computer (1) to access the network (5) and central processor (7) directly. In the latter case (2), relevant information is passed via telco device to a Service Center/telco representative, who then passes the data via the network (5) to the central processor (7). [NOTE: The various available protocols for authorizing new card use via telco are well known and thus not described here in detail.)

Login (52) utilizes a combination of the cardholder credit card number, followed by the cardholder Public Key (38). Data entered by the cardholder is compared against the number and Public Key stored in the cardholder data file (42).

If the Public Key (38) or card number is incorrect, the cardholder may attempt to reenter (54) the information (52). In the event of three login failures, the terminal operator (cardholder or Customer Service/Telco defaults to the context-sensitive Help screen (5).

If Public Key and credit card numbers are correct, the login is successful and recorded in the customer data file (42).

Cardholder transaction capability is immediately activated (FIG. 5) and the invention links the user (cardholder (2) or Customer Service/Telco [3]) to Cardholder Settings (FIG. 6).

The Cardholder Application Process (FIG. 2,3,4) is complete, and for Transactions (FIG. 5), the Transactions Function utilizes standard protocols to initiate, authorize, and track credit card transactions. Transactions (56) are authorized by upstream transaction processors (58), which transmit (5) to the invention Central Processor (7), which logs activity into the Cardholder Transaction Database (62), linked to the Cardholder Data File (42). Transaction data is routed to Cardholder Credit Allocation (FIG. 16), and Reporting (FIG. 17).

Turning to Cardholder Settings (FIG. 6), numerous functions important to the invention are carried out, all of which are accessible preferably solely by Data Input Screen Terminal (1):

Main settings interface (FIG. 6);
Password creation and modification (64) (FIG. 7);
Email status (66) (FIG. 8);
Public key (68) (FIG. 9);
Mortgage Allocation (70) (FIG. 10);
Allocation Options (FIG. 11);
Mortgage Pool Non-cardholder Contribution Allocation (72) (FIG. 12);
2nd Cardholder Allocation (74) (FIG. 13);
2nd Cardholder Allocation Restrictions (FIG. 14); and
Application Modification (76) (FIG. 15).

Settings are stored in the Cardholder Data File (42). Settings may be altered solely by use of a Data Input Screen Terminal (1). Changes may be input directly by the cardholder (2), employing a computer such as an iBook laptop utilizing a 56K internal modem and an Internet Explorer Version 5 browser, by a Customer Service/Telco representative (3) acting on behalf of a cardholder, or by a Customer Service/Mail representative (4) charged with inputting Settings data supplied to the invention via the cardholder statement (FIG. 17). All changes to settings are confirmed through (78) FIG. 18.

More particularly, in Password Creation and Modification (FIG. 7), the password is a secret code the cardholder must use to access his or her account. The password is distinct from the Public Key (FIG. 9). On first use, no password exists and the value of Password Status (80) is [NULL]. The Cardholder or Customer Service/Telco representative enters a password or pass phrase at Block 82. There is no maximum or minimum length, although cardholders will be advised to select a password of at least six alphanumerics. On [SUBMIT], the invention performs a Uniqueness Test (84), scanning the complete Subscriber Database (14) for duplicates. NOTE: As envisioned in this embodiment, there is no need to conduct this Uniqueness Test, as each customer's primary ID is unique. Password duplications are therefore irrelevant. However, the inventors recognize that future or other security needs may require unique passwords. The password is entered into the Cardholder Database (42), and is activated pending Confirmation (78) (FIG. 18).

Modifying a password (86) utilizes standard online procedures.
Old password: oooooooooooo
New password: oooooooooooo
Confirm new password: oooooooooooo
Activate.

The changed password is stored in the Cardmember Data File (42). The invention refers to FIG. 18, Confirmation of Allocations.

Email (88) is a sub-routine executed whenever a cardholder revises his or her application information (FIG. 15). Changes to First Name, Middle Name, Last Name, Street Address, City, State (22) instruct the invention to generate a new invention email (92). The invention executes its uniqueness test (84) by a search of the subscriber database (14). The cardholder is queried whether to replace his/her existing invention email address with the new invention email address. (94). If YES, the invention enables the new address (pending confirmation). If NO, the invention writes the new address in the cardholder data file (42), but continues to display the old address. In the event of a change in a cardholder's email (26) the invention replaces the prior email field value with a new value at establish/change redirect email (90). The invention's new email is activated upon confirmation (FIG. 18).

Public Key (FIG. 9) involves a routine for allowing the cardholder to determine what information is displayed in the searchable Public Key Database (102). This database comprises the shared interface between cardholders and is thus critical to the implementation of the method of claim 18, associating the mortgage with second card activity of a second cardholder. The cardholder may elect either to Display Public Key (98), or Not Display Public Key (96) in the Public Key Database (102). If the cardholder elects to display, s/he may manage the amount of additional information to be displayed in the Public Key Database (102). This process is managed through the Public Key Options (108) interface. Here are the default values for the available options. "1"==enabled; "0"==Not enabled; [NULL]==void; no content; REF==Referral Link

| | |
|---|---|
| Public Key | 1 |
| Cardholder name | 0 |
| Target mortgage # | 0 |
| Target mortgage address | 0 |
| Cardholder invention email | 1 |
| Text information | [NULL] |
| Image | [NULL] |
| URL | [NULL] |
| Mortgage Data Transfer | REF |

When activated, the invention retrieves relevant data from the Cardholder Data File (42). Exceptions to this are Text information, Image, and URL data fields. Cardholders must enter this data themselves using form text fields. Mortgage Transfer Data (FIG. 20) information is not displayed in this database. The Database Option indicates whether the Transfer option is active or disabled.

The inventors expect that most cardholders will display minimal information: Public Key, invention email, and Mortgage Data Transfer status. However, some users may be much more aggressive, even to the point of actively soliciting contributions from other members. Other members may just as aggressively promote the availability of unallocated credits. Public Key Status (100) also manages Changes to a Public Key (104), resulting from changes to an application (FIG. 15). The invention searches the Subscriber database (14), and if a proposed public key is unavailable, the user may Retry (106). Changes to the Public Key and Database Options (108) are recorded in the Cardholder database (42).

Any changes made to Public Key Status must be confirmed (78), prior to activation.

Mortgage Allocation (FIG. 10) is a function important to this embodiment of the invention, requiring several unique programming instructions. The invention queries cardholders for three types of information:

which mortgages to credit (110);
what type of credit to perform (124); and
how to process the credit (133).

Cardholder Mortgage Data (110) is collected using an online form and stored in a Mortgage Data File (111), attached to the Cardholder Data File (42). Block (114) requests information about the Mortgagee: Name, Address, Phone, Fax, Email. Block (116) requests information about mortgage terms, including: Address of mortgaged property, amount of mortgage, due date, type of mortgage (ARM, fixed-rate, etc.), and the status of the property:

Primary residence;

2nd Home/Vacation home;
Investment/income property;
Business;
Farm/Ranch; and
Other (specify);

The status (enabled/disabled) of Mortgage Transfer Authorization (43) (FIG. 3) is displayed as a checkbox. Block (118) requests the mortgage account number. Block (120) queries the cardholder about any other mortgages s/he wishes to list. If yes, the invention opens a new set of information windows (112-116) to request information about Mortgagee 2, etc. This additive process continues until the cardholder states there are no further mortgages to list.

Once a cardholder has submitted his/her mortgage data (110), the invention begins the allocation process by generating a custom HTML page of Mortgage Allocations (124), the contents of which are diagrammed in FIG. 11, Allocation Options.

The invention retrieves data from FIG. 11, and then queries the user (2,3,4) to specify whether Credit Allocations (126), or Direct Cardholder (128) Allocations are credited to Mortgage Principle (130) or Mortgage Interest (132).

In default setting is Mortgage Principle (130), the user (at 2,3,4) makes this decision for each displayed Allocation generated in FIG. 11. If Mortgage Principle is selected, the user then determines Payment Method (134), with Electronic Funds Transfer (EFT) to mortgagee (136) the default. Optionally, cardholders may elect to receive checks (140), payable to the target Allocation Option (FIG. 11), via their monthly statement. If Mortgage Interest is selected for any of the cardholder's active Allocation Options (FIG. 11), then payment via check (140) is the only available option. [NOTE: this is due to the need to meet mortgage payment due dates, which the invention cannot guarantee.]

If the invention defaults to payment via check (140), or the user selects this option, Postage & Handling Assessments (138) may be incurred. The user is so notified at the time of his/her selection, via Confirmation of Mortgage Allocation Settings (FIG. 18), and via standard Reporting (78) (FIG. 17).

Additionally, if Mortgage Interest payment (132) is selected, the user may be allowed to deduct interest payments. The invention conducts a Mortgage Deductibility Assessment (142), searching data provided by the user in (116) (FIG. 10). If allowed, the invention prepares IRS Form 1098 (144) annually.

Mortgage Allocation is complete, pending confirmation (FIG. 18).

Turn now to FIG. 11, Allocation Options. Allocation Options (FIG. 11) manages four program processes: Allocation Options, Option Select, Allocation Format and Allocation Priority (146). In FIG. 11, each function is placed below its description. E.g., "Credits applied" (154) (FIG. 17) is positioned under the Option Select function.

For Allocation Options, the following Allocation Options are displayed:
 a. Cardholder Mortgage Data (110)
If more than one mortgage (148, 150), is listed, the cardholder's Primary Residence mortgage, if specified (116), is always listed first. Otherwise, mortgages are listed in the order entered by the cardholder. Each cardholder mortgage displays the same set of available options (Option Select, 146).
 b. 2nd Cardholder Contribution (160)
2nd cardholder Contribution (160) has option (Yes/No). Default is No (164).
 c. Non-Cardholder Contribution (162)
Non-cardholder Contribution (162) has option (Yes/No). Default is No (164).
 d. Direct Contribution (180)
Direct Contribution (180) has option (Yes/No). Default is No (182).

Option Select Choices (146) are such that for each mortgage (148, 150), the customer may choose either No Credits Applied (152), a specific amount of credits [Credits Applied (154)], or all credits [All Credits Applied (156)]. The default setting is No Credits Applied (152). If No Credits (152) and/or Credits Applied (154) are selected for all listed mortgages (148,150), then the 2nd cardholder contribution option (160) and Non-cardholder Contribution option (162) are active and available.

If the 2nd Cardholder (160) and Non-cardholder Contribution (162) options are available, the default Option Select (146) setting is No (164), meaning credits or direct contributions are available, but have not been allocated. If the cardholder selects All credits Applied (156) for any listed mortgage, then the 2nd Cardholder Contribution Option (164) and Non-cardholder Contribution Option (162) are inactive, and appear 'grayed out' on the cardholder or cardholder representative computer display.

By selecting Yes (184), the Direct Contribution Option (180) overrides the All Credits Applied (156) instruction and reactivates 2nd Cardholder (160) and Non-cardholder Contribution (162) Allocation Options. Default is still set to No (164), unless or until the cardholder selects Yes (166).

Allocation Format is such that once a cardholder or cardholder representative has selected his/her options, s/he quantifies his/her credit allocations displayed under (146)

Allocation Format. If No Credits Applied (152) is still applied to all options, then no quantification is possible; Allocation Format is not visible. If All Credits Applied (156) is applied to any specific mortgage, then no further quantification is possible, and Allocation Format is not visible. If Credits Applied (154) is active, the Allocation Format options are visible.

The Cardholder or representative selects a combination of Percentage Amount (170) and/or $ Amount (168) credit allocations for each listed mortgage. Percentage Amounts (170) are error-checked by the invention to prevent disbursements of greater than 100 percent (174).

For EXAMPLE 1: credit allocations may be a combination of percentages and fixed amounts. For example, a cardholder may elect to direct 50% of all credits to his/her primary mortgage, another 25% to a 2nd Cardholder's mortgage, and $25 to a specific charity. Assume the Cardholder has an available credit of $200. $100 would be directed to the primary mortgage; $50 to the 2nd Cardholder mortgage, $25 to charity, and $25 would be unapplied and retained. If the Cardholder has only $80 in available credits, $40 would go to the primary mortgage; $20 to the 2nd Cardholder, $20 to the charitable donation and no unapplied credits would remain.

In the event that credits remain unapplied (158), the invention invokes the Unapplied/Unawarded routine described in FIG. 16, Cardholder Credits Function. If 2nd Cardholder (160) and/or Non-cardholder Contribution (162) Options are available, subroutines for these processes are called by the invention (178) (FIGS. 12) and (176) (FIG. 13). If 2nd Cardholder (160) and/or Non-cardholder Contribution (162) Options were called by activation of the Direct Contribution (180), a % Amount (170) credit allocation is disallowed. Only a $$ Amount (186) direct contribution may be entered.

In order to make a Direct Contribution (180), the cardholder or representative must specify a Frequency (188). The Cardholder or representative selects whether the Contribution will occur with each Cardholder Statement (492) (FIG. 17), or One Time Only. If the latter, the invention processes the Direct Contribution (180), administers due diligence, then deletes the value and resets the Direct Contribution Option (180) to No (182). If repeat Direct Contributions are specified, the invention processes the Direct Contribution, retains the Direct Contribution Option Settings, and via FIG. 17 (Reporting) issues the cardholder an electronic and print notification (190) with each Statement (492) (FIG. 17). Upon issuance of the notification, the Cardholder must amend or delete the Direct Contribution within a specified time, or it will be reapplied.

Direct Contribution Target Allocations (200) is the list of available Allocation Options to which Direct contributions may be made. The invention retrieves data from FIGS. 10, 12, and 13, allowing the cardholder or representative to select from the cardholder's mortgages, available Non-cardholders, and 2nd Cardholder mortgage pools. In the third case, search & confirmation routines may be invoked. These are described in FIG. 13 and its dependent illustrations.

With regard to Allocation Priority, the Cardholder (2) or representative (3,4) has identified all his/her proposed credit allocations. Now, s/he prioritizes these allocations at Allocation Priority (146). Direct Contributions are the equivalent of cash contributions. Consequently, there is no need to prioritize Direct Contribution Options (180). Once confirmed (FIG. 19), they are executed. Each active Allocation Option (146) is ranked by importance at Prioritize Allocations (172), with the highest priority item receiving a "1". Priority numbers are determined by the formula (NUM_OPTIONS==TOTAL_NUM_PRIORITY). For example, if there are five active Allocation Options, then the Cardholder or representative ranks the Allocation Options as 1, 2, 3, 4, or 5.

For EXAMPLE 2: In the previous EXAMPLE 1, credit allocations were assumed to be prioritized as entered: 50% toward a cardholder primary mortgage; 25% to a 2nd cardholder mortgage; $25 to charity, and any remainder as an unapplied credit. In those cases where available credits are greater than specified allocations, allocation priority is not a factor. However, in cases where available credit is less than specified allocations, Allocation Priorities can significantly affect allocations. In the prior example, we last assumed the Cardholder had only $80 in available credits. $40 was allocated to the primary mortgage; $20 to the 2nd mortgage, and $20 to charity. If the charitable donation was given top priority ("1"), the $80 of credits would be distributed: $25 to charity; $40.00 to the primary mortgage; and $15 to the 2nd cardholder mortgage. Taken further, if $50 of credits were available, $25 would go to charity, $25 to the primary mortgage, and $0 to the 2nd Cardholder.

Mortgage Pool Allocation (FIG. 12) is a sub-routine within the Allocation Options (FIG. 11) process. As described in FIG. 11 above, users may elect to award credits to non-cardholders, which may be comprised of select individuals, community groups, and charitable organizations. The intent of the invention is to enable users to contribute to mortgage "pools"—Pool Participant Database (204), which assist lower-income, disadvantaged, handicapped, first-time, or other qualifying potential homebuyers' efforts to secure a mortgage. While this is the intent, it is not a rigorous standard. Any worthy charity or group may be selected for inclusion (206-212).

The user may elect to award to credits to as many available choices as s/he desires. The value of the awards (214-220) may also vary. Again, the user has the option of specifying Credit Allocations (136) and/or Direct Cardholder Allocations (128) stated in FIG. 11 Allocation Options, to his or her Mortgage Pool Allocation (222).

The invention then queries Payment Method (134): whether to deliver the allocations via EFT, or as a check(s) sent to the cardholder via his/her statement and addressed to the pool recipient(s) (206-212). In the latter case, a Postage & Handling Assessment (138) may be executed, as the inventors anticipate that licensees may seek to discourage 'hard copy' disbursements.

The cardholder selections are confirmed (78). If annual charitable contributions exceed $75, the invention delivers an online and printed statement of the value of the donations per IRS guidelines (438). (See Reporting, FIG. 17).

Turning now to 2nd Cardholder Mortgage Allocation (FIG. 13), there is shown a process whereby a Cardholder may direct credit awards to any other Cardholder and to any number of Cardholders. All cardholders theoretically may be 2nd Cardholder Mortgage Allocation recipients as well as primary cardholder contributors.

Critical to 2nd Cardholder Mortgage Allocation is the Public Key, described in FIGS. 9 and 19. A cardholder maintains (at FIG. 9) either a Published (98) or an Unpublished Public Key (96). The degree of information displayed in the Public Key Database (102) also may be controlled by the cardholder. The cardholder further is able to manage the degree of information and control s/he wishes to display or allow (FIG. 14) when contributing to a 2nd Cardholder.

The process begins by a user activating the 2nd Cardholder Option in FIG. 11 (166). The 2nd Cardholder Allocation is executed as a sub-routine of FIG. 11. Gathering 2nd Cardholder Data (440) can involve several steps. Restrictions (441) is a sub-routine described in FIG. 14. Settings from FIG. 14 are parsed here (441). Public Key Search (442) is a tool to locate any cardholder's Public Key. If a desired Public Key is published, the user (2, 3, 4), is linked to a display of that 2nd cardholder's Public Key database information (102), as determined in FIG. 9. If the Public Key is not known or otherwise unavailable, the user must initiate a 2nd Cardholder Public Key Authorization Request (FIG. 19, 446). This process is repeated for each additional non-primary cardholder mortgage (444). At this point, the invention reiterates the process described in FIG. 10, Mortgage Allocation. The user (2, 3, 4) allocates credits and/or direct cardholder contributions (126, 128) toward principle and or mortgage interest (130,132). Payment method (134, 136, 140) is selected, and tax credits, if any, are determined (142, 144).

Selections are confirmed via (78) FIG. 18, and see 2nd Cardholder Mortgage Allocation: Restrictions (FIG. 14). FIG. 14 is the cardholder's disclosure record. A database record is maintained at FIG. 13 (441) for each 2nd Cardholder Mortgage Allocation. E.g., the primary cardholder may choose to disclose more information to one recipient than to another. The query options are:

Disclose cardholder name? (447)

Selecting Yes means that the 2nd cardholder Received Credits Report (496) (FIG. 17) will include the contributor's name & email information.

Disclose value/amount of contribution? (448)

Selecting yes discloses the cumulative value of the cardholder's contribution in the Received Credits Report (FIG. 17).

Allow 2nd Cardholder to reallocate? (450)

If yes, the 2nd cardholder may use the credit contribution any allowed purpose. S/he may contribute to a non-cardholder, or pass credits to another cardholder.

Consequently, the primary cardholder may be entitled to receive tax benefits. The invention examines the 2nd cardholder settings and allocations (456), and issues a charitable donation form as needed (438).

Principle only? (452) pertains to the cardholder optionally specifying that contributions may be used solely to pay down the 2nd cardholder's mortgage principle. However, if interest payments are enabled, the invention will query primary and 2nd cardholder settings to determine whether the either party may receive an interest tax credit (142,144).

Disclose terms? (454) optionally determines whether the above conditions are shared with the 2nd cardholder. If yes, they are disclosed in the cardholder's Received Credits Report (FIG. 17). Settings changes are confirmed via FIG. 18 (78), and turn now to Application Modification (FIG. 15).

Application Modification (FIG. 15) is the final Settings Function process. It employs well-known programming to allow cardholders to update their original Card Application (FIG. 2,3,4) in the event of a change in address (22), telephone (28), email (26), Mortgage Data Transfer (43), name (22), or other information (456). In the event of a change in Address (22) or Telephone (28), a new Public Key (38) will be generated reflecting the revision. The invention references FIG. 9 Public Key Status. Similarly, in the event the Zip Code field of an Address (22) is changed, and/or a cardholder's email (26), a new invention email (92) and/or email redirect (90) is generated for the user. The invention references FIG. 8 Email Setting. NOTE: the user may elect to continue to display his/her prior email, or elect to use the new address.

Additionally, the invention recognizes that certain changes to an application may require special handling. Thus, Name (22) changes for reasons other than marriage (458), and unspecified changes (456) are referred to a Customer Service (460) representative. The invention can be configured to initially display an "800" number for Customer Service, but live online help is within the scope of the invention.

The invention queries whether the user wishes to save other changes (462). If YES, the invention references FIG. 8, Confirmation of Allocations (78). If NO, the existing page remains on screen. In order to complete Customer Service Referrals (460), the user contacts Customer Service/Telco (3).

An authorized Customer Service/Telco representative Logs In (464), then queries the cardholder and enters required data (466). Any changes are confirmed (78).

In Cardholder Credit Function (FIG. 16), the Cardholder Credits Function manipulates data received from Cardholder Transactions (FIG. 5, 62), Credit Calculation (468) rates, and the Cardholder's Settings (FIG. 6 et. al.) to Pay Allocated Credits (476). The invention takes into account whether or not Payment Terms (470) have been satisfied, and reports outcomes to FIG. 17 Reporting (478). The Cardholder Credit Function exists wholly behind a firewall (480). Cardholder Credit Function is not directly accessible by cardholders (2), Customer Service/Telco (3) or Customer Service/Mail (4) representatives.

Cardholder Transaction data (62) for the current statement period is imported from FIG. 200. Credit Calculations (468) are performed to determine the total number of new credits to be awarded. This calculation may be based on any reasonable formula; e.g., 5% of total purchases recorded during the current period; 1% of total purchases+10% of balance carried forward, etc. The inventors assume that licensed versions of the invention may offer different Credit Calculation award structures.

Possible restrictions on payments are reviewed in Payment Terms (470). Once again, this is a formulaic review based on standards established by the invention and/or its licensees. For example, awarded credits may be withheld [Withheld Credits (474)], from cardholders who are behind in payments; have paid an insufficient portion of an outstanding balance; have exceeded authorized credit limits; have outstanding contested charges; etc. The invention may also issue a portion of awarded new credits rather than all, or no credits. A regular payment review (472) is conducted, based on either statement schedule or cardholder request.

If any credits are issued, the invention will Pay Allocated Credits (476) according to Cardholder Settings for the Non-Cardholder Mortgage Pool (202), Cardholder Mortgage (110), Additional Cardholder Mortgages (120), and 2nd Cardholder Mortgages (440). Credit Allocation results are referred to FIG. 17 Reporting (478). Unapplied Credits (158)—that is, credits remaining after the Cardholder's Settings Allocations have been completed—are also referred to FIG. 17 Reporting. Unapplied Credits (158), along with Withheld Credits (474), are reviewed for possible Credit Interest Calculation (476). This is a variable formulaic process wherein the invention and/or its licensees may award additional credits to unallocated credit caches. The process functions as a 'savings account' for the cardholder.

Any legal formulaic calculation is allowed. For example, a licensee may choose to award 1 additional credit for every 100 unapplied credits. Or, a licensee may choose to allow a cardholder to apply unapplied credits to his or her credit card Minimum Payment Due or outstanding balance.

The outcome of any Credit Interest Calculation (476) is referred to FIG. 17 Reporting. Reporting Function (FIG. 17) addresses this is the invention's due diligence process. In brief, Reporting (FIG. 17) prepares and distributes (500) the cardholder's regular Statement (492). The Statement (492) reviews current transactions (62), the disbursement of cardholder credits (482,484,486,488), any receipt of credits from other cardholders (496), Direct Contribution (128), and the cardholder's current Settings (FIG. 6, 498). It also includes a Forecast (490), which embodies Claims 7 and 8 of the invention, computing a forecast for repayment of the mortgage and communicating the forecast to the cardholder.

Using Network Communications Systems (5), a cardholder (2), may review his/her Online Statement (502) using a Data Input Screen (1). The Cardholder may access Cardholder Settings (FIG. 6), but further access to the Reporting Function by the cardholder is barred by firewall (480).

Similarly, transaction data (62) is transmitted to the Central Processor (7), but further access is prohibited by firewall (480). [The inventors presume that third party transaction data will be transmitted to the invention by a TCP/IP-enabled Electronic Data Interface (EDI) system.

The following credits are reported:

Pending Credits, which are retrieved from the FIG. 16 Credit Calculation. Pending Credits (482) represent the maximum number of new credits a cardmember has earned, including withheld credits (604);

Available Credits (484) is the sum of [Pending Credits (482)]+[Unapplied Credits (158)]−[withheld credits (474)];

Invested Credits (486) details the cardholder's total credit allocations (FIG. 16) for the reporting period;

Cleared Credits (488) details cardholder credit allocations that were applied by the recipient(s) during the reporting period;

Direct Contributions (128) details the cardholder's total direct contributions (FIG. 16) for the reporting period;

Received Credits (496) details credits received by the cardholder from other cardholders;

All reported information is recorded in the Cardholder Data File (42). Additionally, this information is employed by the invention to prepare the cardholder's mortgage forecast (490).

The Cardholder Data File (42) for the reporting period is included in the Cardholder Statement (492), which also contains transaction (62) data and cardholder payment (60) information supplied by the provisioner. The Statement also includes the Forecast (490), and Cardholder Settings (FIG. 6, 498). These relationships are shown as dotted lines for clarity purposes; in fact, all data is already stored in the Cardholder Data File (42).

The invention distributes the Statement (492) as both an online document (502), and a mailed statement (506). Checks, if any (504) are enclosed in the mailed statement, pursuant to claims 2 and 3, wherein the invention communicates a funds transfer to the cardholder, prints a check for the amount, prints a coupon with the amount for carrying out payment of the mortgage with the check, combining the check and the coupon with a statement of the card activity so as to address the envelope to the cardholder. Checks directed to a mortgage servicer satisfy claims 4 and 6 of the invention, wherein a funds transfer is communicated to a mortgage servicer, including printing a check for the amount, printing a coupon with the amount for carrying out payment of the mortgage with the check, and combining the check and the coupon with a statement of the card activity in an envelope so as to address the envelope to the mortgage servicer.

Focus now on Allocation Confirmation (FIG. 18) which illustrates a routine is called throughout the invention. Whenever a cardholder or cardholder representative changes his or her settings (FIGS. 6-15), FIG. 18 Confirmation requests confirmation of the changes. As previously described, changes to settings initiated with a computer by a cardholder (2) or a cardholder Customer Service representative (3,4) are transmitted via Network Communications Systems (5) to the invention's computers (7). Alterations are entered into the Cardholder Data File (42), and are flagged as 'pending' (518) prior to confirmation and enabling (520).

The following description utilizes reasonably common confirmation protocols. The invention dispatches a confirmation email to the cardholder invention email and email redirect (508). The confirmation email details each proposed alteration and requests that the cardholder reject or confirm the changes (510). The response mechanism (510) is an online form field containing the following:
The invention displays each proposed change, with a Yes and No checkbox beside each. The cardmember approves or rejects. The invention displays a text field for the Public Code of the cardholder, and the Cardholder Password. The user (2,3,4) enters the Public Code and Password, which the invention checks against the cardholder data file (42).

If either entry is incorrect, the invention prompts the cardholder or representative to try again. If a correct entry cannot be made, the invention characterizes the attempt as equivalent to "no response".

If the cardholder responds "reject", the proposed alterations are discarded (512).

If the cardholder authorizes the changes (514), the settings are enabled.

If no response is given—i.e., the cardholder does not respond to the confirming email—a second attempt at confirmation is made via the cardholder's subsequent Statement (492).

The statement form request (522) is similar to the online version offered in (510). The statement form (522) offers the cardholder three confirmation methods: via email, telco, and statement. If the cardholder opts to confirm using his/her statement, his/her signature replaces the Public Key and Password as confirmation. If no response is forthcoming, of if the changes are rejected, the proposed alterations are discarded (512).

If approved, the settings alterations are enabled (514) and recorded in the Cardholder Data File (42).

Public Key Authorization Request (FIG. 19) illustrates the concept of mortgage pooling (FIG. 10, 440) is unique to the invention. As previously described, cardholders exercise absolute control over the personal information they choose to display in the Public Key database (102), and also the amount of information and control they wish to provide recipients of credits (FIG. 14).

The degree of cardholder control ranges from aggressively promoting the need for or availability of credits, to revealing no information whatsoever, Public Key included. The invention therefore must allow for a wide range of Public Key disclosure.

The Authorization Requests begins with a cardholder identifying the Public Key of another cardholder (524). If the Public Key of a 2nd cardholder is unknown, the cardholder searches the Public Key Database (102), which may be searched by any of the criteria listed in FIG. 9, Database Options (108). In all searches the central processor (7) confirms the existence of a Public key (540) before proceeding.

If the Public Key is unpublished (96), the invention will generate a Public Key Disclosure Request (526), which is relayed via email through Network Communications Systems (5) to the 2nd cardholder's data terminal (528).

For this communication to take place, the cardholder (2) must know the 2nd cardholder's invention email. If the 2nd cardholder refuses to provide his or her Public Key to the cardholder and thus rejects the credit offer (530), then the invention dispatches an email to the cardholder so stating (532)

As an EXAMPLE, assume that parents seeking to contribute to a child's mortgage will telephone the child to request the Public Key, or invention email. In other instances, a cardholder may only list his/her email in Database Options (108), thus requiring that all cardholders submit a formal request for the Public Key.

If the 2nd cardholder (528) agrees to provide his/her Public Key, the invention dispatches an email to the cardholder so stating, including the Public Key ID (534). The invention Central Processor (7) transmits the Public Key to the cardholder (2) via Network Systems (5). The cardholder (or representative) now is able to offer a mortgage contribution to the 2nd cardholder (528). The offer is passed via Network (5) to the 2nd cardholder, who either accepts (536) or rejects (542) the proposed contribution. The Network (5) transmits the outcome to the invention Central Processor (7). Upon acceptance, the invention generates an acceptance email (538), which is forwarded to the cardholder (2). Upon rejection, a rejection email (546) is dispatched to the cardholder (2).

In either case, the cardholder and 2nd cardholder data files (42) are updated to incorporate allocation changes, if any. Settings (FIGS. 6-15), Credit Allocations (FIG. 16), are modified to reflect any changes. The invention exercises due diligence and conveys the authorization request and its outcome to FIG. 17 reporting.

Turn now to Auction Management (FIG. 20) wherein an Auction Management process is illustrated. In brief, data gathering authorized by the cardholder is made available to lending companies willing to compete for the cardholder's mortgage account, with an object of lowering a cardholder's ongoing mortgage costs. The process incorporates the methods of 2nd Cardholder Mortgage Allocations (FIG. 13), Mortgage Pool Allocations (FIG. 12), 2nd Cardholder Restrictions (FIG. 14), Public Key generation (FIG. 9), and Public Key Authorization (FIG. 19).

This process is enabled whenever a cardholder authorizes a Mortgage Data Transfer from his or her mortgage provisioner (FIG. 3, 43). The invention Central Processor (7), drawing on mortgagee data supplied by the cardholder (2) and stored in the Cardholder Data File (42), initiates a Network (5) request to the mortgagee for the transfer of the cardholder's mortgage data (6).

Retrieved Mortgagee Mortgage Data (6) is stored in a sub-directory of the Cardholder Data File's (42) Cardholder Mortgage Data File (111), called the Cardholder Mortgage E-file (550). This sub-directory is separated by firewall (480) from the balance of the Cardholder Data File. Each Cardholder Data File is stored within the comprehensive Subscriber Database (14).

Other mortgage lenders may now query the Subscriber Database's (14) Cardholder Mortgage E-Files (550). And, if so determined, tender a Mortgage Lender Tender Offer (554) via network communication systems (5) to any participating Cardholder Data Terminal (2).

The rationale for lenders to participate in the Auction are discussed in the Objects of the Invention. The inventors anticipate that the Auction will be a highly desirable tool for both lenders and consumers. To that end, the invention anticipates establishing Lender Terms (572), wherein the invention and/or its licensees may potentially require any lender who tenders an offer must agree to make its own lender pool data available to the invention.

Once an offer has been tendered, the cardholder may Reject (568) the offer; Counter (556), or accept the proposed mortgage (558). In the first case, the Central Processor (7) dispatches a rejection email (570) to the mortgage lender. In the case of a counter, the cardholder directly sends a counter email (556) to the mortgage lender, who may or may not enter into further negotiations (562) with the cardholder (2). Finally, if an offer is accepted, the Central Processor dispatches an Acceptance email (566) to the selected lender (560), which Negotiates (562) with the cardholder (2).

In the event of a successful transaction, the invention Central Processor (7) computes and assesses any Enabling Fees (564) chargeable to the Selected Lender (560) or cardholder (2). These fees are formulaic in nature, and may be either a fixed fee, a commission, or nothing. Negotiated fees—i.e., negotiated on a case-by-case basis—are also possible, based on the discretion of the inventors and licensees.

If an Auction is successful, the Central Process (7) updates numerous functions, including the Application (FIGS. 2 and 15), Mortgage Allocations (FIGS. 10 and 11), email and Public Key (FIGS. 8 and 9), and the Crediting and Reporting functions (FIGS. 16 and 17).

While the above description contains many specificity's, these should not be construed as limitations on the scope of the invention, but rather as an exemplification of one preferred embodiment thereof. Many other variations are possible such as, but not limited to, those described in the Objects and Advantages section above. Thus, the scope of the invention should be determined by the appended claims and their legal equivalents, rather than by the principal embodiment and other examples described above.

We claim:

1. A method of using an apparatus for card activity-based mortgage crediting, the method including the steps of:
   providing a digital computer operably associated with an input device and with an output device;
   associating, by said digital computer, data input at said input device, the data representing card activity with further input data representing a mortgage of a property, the mortgage including principal and interest;
   determining, by said digital computer, a card activity reward by calculating a function responsive to the card activity of a cardholder;
   receiving an allocation instruction from the cardholder, the allocation instruction selected from among a group presented to the cardholder, the group comprising allocating the card activity reward to the interest of the mortgage, allocating the card activity reward to the principle of the mortgage, and allocating the card activity reward to a combination of the interest and the principle of the mortgage;
   crediting, by said digital computer, the card activity reward to a payment of the mortgage according to the allocation instruction of the cardholder, wherein if the allocation instruction corresponds during a year to crediting of the reward to the mortgage interest or to crediting of the reward to the combination, crediting the reward to produce a mortgage interest tax deduction for the year; and
   generating, by said digital computer at said output device, output including the card activity reward being credited according to the allocation instruction of the cardholder.

2. The method of claim 1, wherein the allocation instruction is associated, by said digital computer, with a monthly payment of the mortgage.

3. The method of claim 2, further including:
   communicating a funds transfer, including an amount determined by the reward, to the cardholder by printing a check including the amount determined by the reward, printing a coupon including information used for carrying out payment of the mortgage with the check; and
   combining the check and the coupon with a statement of the card activity in an envelope to address the envelope to the cardholder.

4. The method of claim 1, further including the step of:
   communicating a funds transfer, including an amount determined by the reward, to a mortgage servicer.

5. The method of claim 4, wherein the communicating includes an electronic funds transfer, including the amount determined by the reward.

6. The method of claim 4, wherein the communicating includes:
   printing a check;
   printing a coupon including information used for carrying out payment of the mortgage with the check; and
   combining the check and the coupon with a statement of the card activity in an envelope to address the envelope to the mortgage servicer.

7. The method of claim 1, further including the steps of:
   computing a forecast reflecting the crediting of the card activity for repayment of the mortgage; and
   generating, with said digital computer at said output device, output including the forecast.

8. The method of claim 7, wherein the allocation instruction is associated, by said digital computer, with an ongoing monthly payment of the mortgage.

9. The method of claim 1, further including the step of:
   changing from one allocation instruction from the group to another allocation instruction of the group in response to an instruction from the cardholder received over the Internet.

10. The method of claim 1, further including the step of:

changing an allocation of the crediting of the card activity reward between the mortgage and a second mortgage in response to an instruction from the cardholder received over the Internet.

11. The method of claim 1, further including the step of:
generating, with said digital computer at said output device, output comprising the mortgage interest tax deduction computed for the year.

12. The method of claim 1, further including the steps of:
combining the crediting of the card activity reward with a non-cardholder contribution and applying the contribution along with the reward according to the allocation instruction of the cardholder.

13. The method of claim 1, further including the steps of:
combining the crediting of the card activity reward with a direct contribution and applying the contribution along with the reward according to the allocation instruction of the cardholder.

14. The method of claim 1, wherein the crediting is carried out by associating a cardholder data file with a mortgage data file.

15. The method of claim 14, further comprising
communicating, from the digital computer to a third party computer, the mortgage data file and the cardholder data file.

16. The method of claim 14, further comprising
communicating, from the digital computer to a third party computer, information from the mortgage data file and information from the cardholder data file.

17. The method of any one of claims 15, 16, further including the step of:
receiving an offer from the third party, and communicating the offer to the cardholder.

18. The method of any one of claims 1, 2, 7, 12, 13, 14, wherein the allocation instruction from the cardholder includes receiving the allocation instruction from the cardholder over the Internet.

19. The method of claim 1, further including:
allocating a portion of the crediting between the mortgage and a charity; and
issuing a tax deduction statement responsive to said crediting to the cardholder.

20. The method of claim 1, further including the steps of:
computing, with said digital computer, an annual statement of said crediting; and
communicating the annual statement to the cardholder.

21. The method of claim 20, wherein the step of computing an annual statement includes:
computing, with said digital computer, mortgage interest paid by the crediting.

22. The method of claim 1, further including:
communicating a funds transfer, including the amount determined by the reward, in carrying out the payment to a mortgage servicer.

23. The method of claim 1, wherein the group comprises allocating the card activity reward to the mortgage and to a second mortgage.

24. The method of claim 1, further including the step of:
allocating a portion of the card activity reward between the mortgage and a charity.

25. The method of claim 1, wherein the associating includes specifying a lender of the mortgage as some of said input data to correspond with a data input screen on a monitor operably associated with said digital computer.

26. A method of using an apparatus in carrying out card activity-based mortgage crediting, the method including the steps of:
providing a digital computer operably associated with an input device and an output device;
associating, by said digital computer, data input at said input device, the data representing card activity with further input data representing a mortgage of a property by associating a cardholder data file with a mortgage data file, the mortgage including principal and interest;
determining, by said digital computer, a card activity reward by calculating a function responsive to the card activity of a cardholder;
responding, by said digital computer, to an instruction of the cardholder to credit the card activity reward to a payment of the mortgage, by using the associated data files in allocating the card activity reward to the interest of the mortgage, allocating the card activity reward to the principle of the mortgage, or allocating the card activity reward to a combination of the interest and the principle, according to the allocation instruction; and
generating, by said digital computer at said output device, output including the card activity reward being credited according to the allocation instruction of the cardholder.

27. The method of claim 26, wherein the payment of the mortgage is a monthly payment of the mortgage.

28. The method of claim 26, further including responding, with said digital computer, to another instruction of the cardholder to change the allocating.

29. The method of any one of claims 15, 16, 26, further comprising merging the files.

30. A digital electrical computer system programmed to carry out card activity-based mortgage reward crediting, the system including:
a data processing system comprising a digital electrical computer electrically connected to an input device for inputting data and to an output device;
the digital electrical computer programmed to carry out the steps of associating data input at said input device, the data representing card activity of a cardholder with further input data representing a mortgage of a property, the mortgage including principal and interest, determining a card activity reward by calculating a function responsive to the card activity, receiving an allocation instruction from the cardholder, the allocation instruction selected from among a group presented to the cardholder, the group comprising allocating the card activity reward to the interest of the mortgage, allocating the card activity reward to the principle of the mortgage, and allocating the card activity reward to a combination of the interest and the principle of the mortgage, and crediting the card activity reward to a monthly payment of the mortgage according to the allocation instruction of the cardholder, wherein if the allocation instruction corresponds during a year to crediting of the reward to the mortgage interest or to crediting the reward to the combination, crediting the reward such that the cardholder has a mortgage interest tax deduction for the year, and to generate output including the card activity reward being credited according to the allocation instruction of the cardholder.

31. A digital electrical computer system programmed to carry out card activity-based mortgage reward crediting, including:
a data processing system comprising a digital electrical computer electrically connected to an input device for inputting data and to an output device; the digital electrical computer programmed to carry out the operations of:
associating data input at said input device, the data representing card activity with further input data representing a mortgage of a property by associating a cardholder data file with a mortgage data file, the mortgage including principal and interest;

determining a card activity reward by calculating a function responsive to the card activity of a cardholder;

responding to an instruction of the cardholder to credit the card activity reward to a payment of the mortgage, by using the associated data files in allocating the card activity reward to the interest of the mortgage, allocating the card activity reward to the principle of the mortgage, or allocating the card activity reward to a combination of the interest and the principle, according to the allocation instruction; and generating output including the card activity reward being credited according to the allocation instruction of the cardholder.

32. A digital electrical computer system, including:

a data processing system comprising a digital electrical computer electrically connected to an input device for inputting data and to an output device;

the digital electrical computer programmed to carry out the operations of:

crediting a reward, determined by calculating a function responsive to card activity, to only an interest component of a monthly mortgage payment, in response to receiving an instruction from a cardholder over the Internet, the mortgage payment including principal and interest components;

associating the card activity reward, determined by calculating a function responsive to card activity, with a mortgage interest tax deduction computer for the year; and generating output including the credited reward, to produce a mortgage interest tax deduction computed for the year.

33. A method of using an apparatus in carrying out computerized card activity-based mortgage reward crediting, the method including the steps of:

providing a digital computer operably associated with an input device and an output device;

crediting, by the digital computer from input card activity, a reward, determined by calculating a function responsive to card activity, to only an interest component of a monthly mortgage payment, in response to receiving an instruction from a cardholder over the Internet, the mortgage payment including principal and interest components;

associating, by said digital computer, the card activity reward, determined by calculating a function responsive to card activity, with the interest component of a mortgage to produce a mortgage interest tax deduction; and generating, by the digital computer at said output device, output including the credited reward.

34. An apparatus to carry out card activity-based mortgage reward crediting, the apparatus including:

a data processing system comprising a digital computer operably associated with an input device for inputting data and to an output device, the digital computer programmed to carry out the steps of:

associating data input at said input device, the data representing card activity with further input data representing a mortgage of a property, the mortgage including principal and interest;

determining a card activity reward by calculating a function responsive to the card activity of a cardholder;

receiving an allocation instruction from the cardholder, the allocation instruction selected from among a group presented to the cardholder, the group comprising allocating the card activity reward to the interest of the mortgage, allocating the card activity reward to the principle of the mortgage, and allocating the card activity reward to a combination of the interest and the principle of the mortgage;

crediting the card activity reward to a payment of the mortgage according to the allocation instruction of the cardholder, wherein if the allocation instruction corresponds during a year to crediting of the reward to the mortgage interest or crediting the reward to the combination, creating a cardholder mortgage interest tax deduction comprised of the reward crediting; and generating output including the card activity reward being credited according to the allocation instruction of the cardholder.

35. The apparatus of claim 34, wherein the allocation instruction is associated, by said digital computer, with a monthly payment of the mortgage.

36. The apparatus of claim 35, wherein the associating includes specifying a lender of the mortgage as some of said input data to correspond with a data input screen on a monitor operably associated with said digital computer.

37. The apparatus of claim 35, further including a computer corresponding to a mortgage servicer, and wherein the digital computer communicates to cause a funds transfer, including an amount determined by the reward, to the computer corresponding to the mortgage servicer.

38. The apparatus of claim 35, further including a computer corresponding to the cardholder, and wherein the allocation instruction is communicated from the computer corresponding to the cardholder to the digital computer.

39. The apparatus of claim 35, wherein the steps further include facilitating, with some of said output, a transfer of funds, including an amount determined by the reward, to the cardholder.

40. The apparatus of claim 35, wherein the steps further include computing a forecast for repayment of the mortgage responsive to the card activity; and wherein:

the step of generating output includes generating output including the forecast.

41. The apparatus of claim 35, wherein the steps further include changing from one allocation instruction from the group to another allocation instruction of the group in response to an instruction from the cardholder received over the Internet.

42. The apparatus of claim 35, wherein the steps further include changing an allocation of the crediting of the card activity reward between the mortgage and a second mortgage in response to an instruction from the cardholder received over the Internet.

43. The apparatus of claim 35, wherein the steps further include:

associating the card activity reward with a mortgage interest tax deduction computed for the year, and further include generating at said output device, output including a mortgage interest tax deduction computed for the year.

44. The apparatus of claim 35, wherein the steps further include combining the crediting of the card activity reward with a non-cardholder contribution and applying the contribution along with the reward according to the allocation instruction of the cardholder.

45. The apparatus of claim 35, wherein the steps further include combining the crediting of the card activity reward with a direct contribution and applying the contribution along with the reward according to the allocation instruction of the cardholder.

46. The apparatus of claim 35, wherein the crediting is carried out by associating a cardholder data file with a mortgage data file.

47. The apparatus of claim 35, wherein the steps further include:
- allocating a portion of the crediting between the mortgage and a charity; and
- issuing a tax deduction statement responsive to said crediting to the cardholder.

48. The apparatus of claim 35, wherein the steps further include:
- computing an annual statement of said crediting, including mortgage interest paid by the crediting; and
- generating output including the annual statement, including mortgage interest paid by the crediting.

49. The apparatus of claim 35, wherein the group comprises allocating the card activity reward to the mortgage and to a second mortgage.

50. The apparatus of claim 35, further including a third party computer, and wherein the steps further include communicating, from the digital computer to the third party computer, a mortgage data file corresponding to the mortgage and a cardholder data file corresponding to the card from the digital computer to the third party computer.

51. The apparatus of claim 35, further including a third party computer, and wherein the steps further include communicating, from the digital computer to the third party computer, information from a mortgage data file corresponding to the mortgage and information from a cardholder data file corresponding to the card from the digital computer to the third party computer.

52. The apparatus of any one of claims 50, 51, wherein the third party computer communicates an offer to the cardholder.

53. The apparatus of claim 52, wherein the offer comprises a new mortgage.

54. The apparatus of claim 52, wherein the offer comprises insurance.

55. The apparatus of claim 35, further comprising a computer corresponding to the cardholder communicating with the digital computer to carry out the crediting.

56. A method of using an apparatus, the method including:
- providing a data processing system comprising a digital electrical computer electrically connected to an input device for inputting data and to an output device; and
- using the digital electrical computer to carry out the steps of:
- associating card activity with a mortgage of a cardholder, the mortgage including principal and interest components, the associating step comprising associating a cardholder data file with a mortgage data file;
- determining a reward by calculating a function responsive to the card activity of a cardholder;
- crediting the reward to only an interest component of a monthly payment of the mortgage;
- generating, for the cardholder, output including the card activity-based mortgage interest reward crediting; and
- communicating information from one of the files to a third party computer, and the third party computer produces an offer to the cardholder.

57. The method of claim 56, wherein the offer is communicated to a computer corresponding to the cardholder.

58. A method of card activity-based mortgage reward crediting, the method including the steps of:
- providing a digital electrical computer electrically connected to an input device for inputting data and to an output device; and
- using the digital electrical computer to carry out the operations of:
- crediting a reward, determined by calculating a function responsive to card activity, to only an interest component of a monthly mortgage payment, in response to receiving an instruction from a cardholder over the Internet, the mortgage payment including principal and interest components;
- associating the card activity reward, determined by calculating a function responsive to card activity, with a mortgage interest tax deduction computer for the year; and
- generating at said output device, output including the credited reward, to produce a mortgage interest tax deduction computed for the year.

* * * * *